US009094205B2

(12) United States Patent
Hartley et al.

(10) Patent No.: US 9,094,205 B2
(45) Date of Patent: *Jul. 28, 2015

(54) SECURE PROVISIONING IN AN UNTRUSTED ENVIRONMENT

(75) Inventors: David H. Hartley, Seaview Downs (AU); Thomas E. Tkacik, Phoenix, AZ (US); Carlin R. Covey, Tempe, AZ (US); Lawrence L. Case, Austin, TX (US); Rodney D. Ziolkowski, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/601,987

(22) Filed: Aug. 31, 2012

(65) Prior Publication Data

US 2014/0064480 A1    Mar. 6, 2014

(51) Int. Cl.
*H04L 17/00* (2006.01)
*H04L 9/30* (2006.01)
*H04L 9/08* (2006.01)
*H04L 9/32* (2006.01)

(52) U.S. Cl.
CPC ............... *H04L 9/30* (2013.01); *H04L 9/0866* (2013.01); *H04L 9/0877* (2013.01); *H04L 9/0897* (2013.01); *H04L 9/3247* (2013.01)

(58) Field of Classification Search
CPC .......... G06F 21/72; G06F 3/038; H04L 17/00
USPC ................. 713/159, 182–186, 168–172, 194; 380/44–47
See application file for complete search history.

(56) References Cited

U.S. PATENT DOCUMENTS

| 6,026,163 | A  |   | 2/2000  | Micali            |        |
|-----------|----|---|---------|-------------------|--------|
| 6,285,991 | B1 | * | 9/2001  | Powar             | 705/76 |
| 6,711,263 | B1 | * | 3/2004  | Nordenstam et al. | 380/282|
| 6,970,562 | B2 |   | 11/2005 | Sandhu et al.     |        |

(Continued)

FOREIGN PATENT DOCUMENTS

| JP | H11239124 A1 | 8/1999 |
| JP | 2004172865 A1 | 6/2004 |

OTHER PUBLICATIONS

U.S Appl. No. 14/571,637, filed Dec. 16, 2014, entitled "Systems and Methods for Secure Provisioning of Production Electronic Circuits". Notice of Allowance mailed Feb. 20, 2015 for U.S. Appl. No. 14/220,507, 10 pages.

(Continued)

*Primary Examiner* — Josnel Jeudy

(57) ABSTRACT

Embodiments of methods of provisioning an electronic circuit enable security of sensitive data in a design and manufacturing process that includes multiple parties. In an illustrative embodiment, a method of provisioning an electronic circuit includes generating at least one secret value, embedding the at least one secret value into the electronic circuit, programming into the electronic circuit a private key derivation function that derives the private key from the at least one secret value and a trust anchor, and programming into the electronic circuit a public key generation function that generates a public key matching the private key. The method can further include receiving for execution trust anchor-authenticated logic that contacts a predetermined actor of the plurality of distinct actors and communicates to the predetermined actor a message signed with the private key.

14 Claims, 30 Drawing Sheets

(56) References Cited

U.S. PATENT DOCUMENTS

| | | |
|---|---|---|
| 7,017,041 B2 | 3/2006 | Sandhu et al. |
| 7,424,610 B2 | 9/2008 | Ranganathan |
| 7,630,493 B2 | 12/2009 | Sandhu et al. |
| 7,685,424 B2 | 3/2010 | Walmsley et al. |
| 7,734,915 B2 | 6/2010 | Neill et al. |
| 7,895,437 B2 | 2/2011 | Ganesan et al. |
| 2002/0078346 A1 | 6/2002 | Sandhu et al. |
| 2003/0159036 A1 | 8/2003 | Walmsley et al. |
| 2003/0174840 A1 | 9/2003 | Bogan |
| 2006/0101288 A1* | 5/2006 | Smeets et al. .............. 713/194 |
| 2008/0044026 A1* | 2/2008 | Walters et al. ............. 380/277 |
| 2009/0132830 A1 | 5/2009 | Haga |
| 2010/0199077 A1* | 8/2010 | Case et al. .................... 713/1 |
| 2010/0205433 A1 | 8/2010 | Neill et al. |
| 2011/0010770 A1* | 1/2011 | Smith et al. ................. 726/18 |
| 2013/0080764 A1* | 3/2013 | Khosravi et al. ........... 713/150 |
| 2014/0068246 A1 | 3/2014 | Hartley et al. |
| 2014/0164779 A1 | 6/2014 | Hartley et al. |
| 2014/0205092 A1 | 7/2014 | Hartley et al. |

OTHER PUBLICATIONS

Restriction Requirement mailed Jun. 6, 2014 for U.S. Appl. No. 13/601,993, 7 pages.

Notice of Allowance mailed Mar. 10, 2015 for U.S. Appl. No. 13/971,886, 21 pages.

U.S. Appl. No. 14/220,507, Office Action—Rejection, mailed Jul. 8, 2014.

U.S. Appl. No. 13/971,886, Office Action—Rejection, mailed Sep. 23, 2014.

U.S. Appl. No. 13/601,993, Office Action—Rejection, mailed Sep. 26, 2014.

Certicom Corporation, "Certicom Security for Silicon Design Protection," pp. 1-2, Jul. 2006.

Certicom Corporation, "Defending Against Grey-market Fraud," Certicom Application Note, pp. 1-4, Feb. 2006.

Craig Rawlings, "Product Authentication Certicom AMS," NIST Product Authentication Information Management Workshop, pp. 1-14, Feb. 2009.

U.S. Appl. No. 14/220,507, Notice of Allowance, mailed Apr. 22, 2015.

* cited by examiner

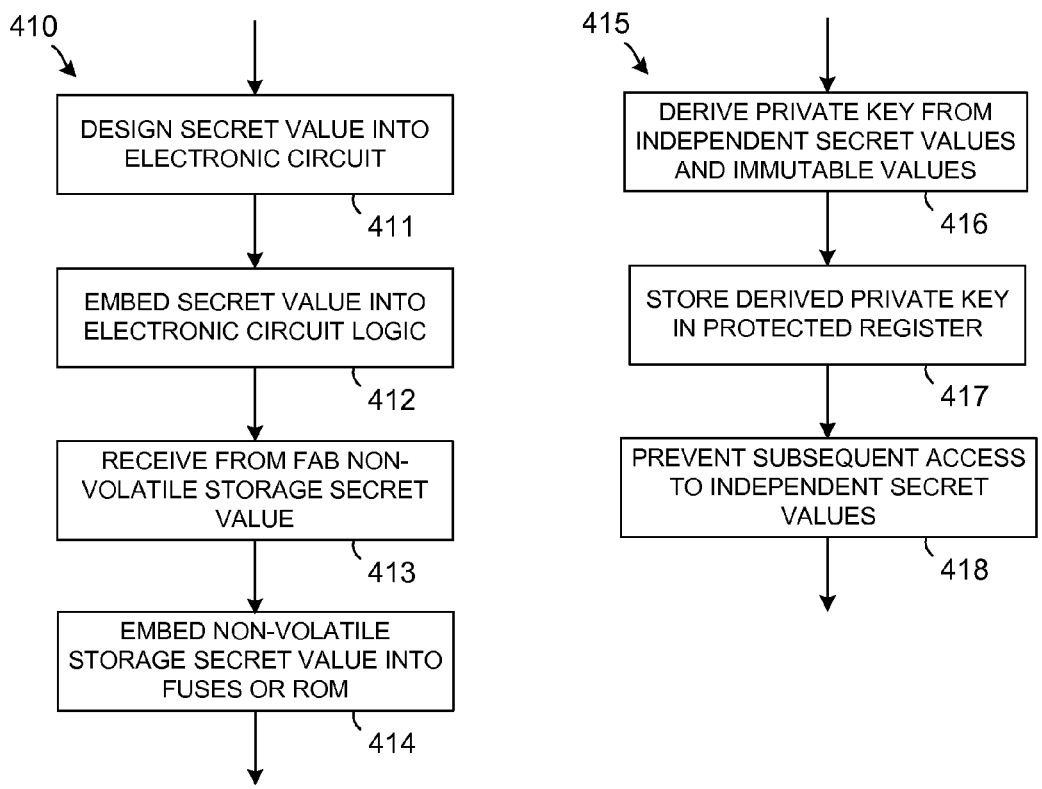
FIG. 4.1

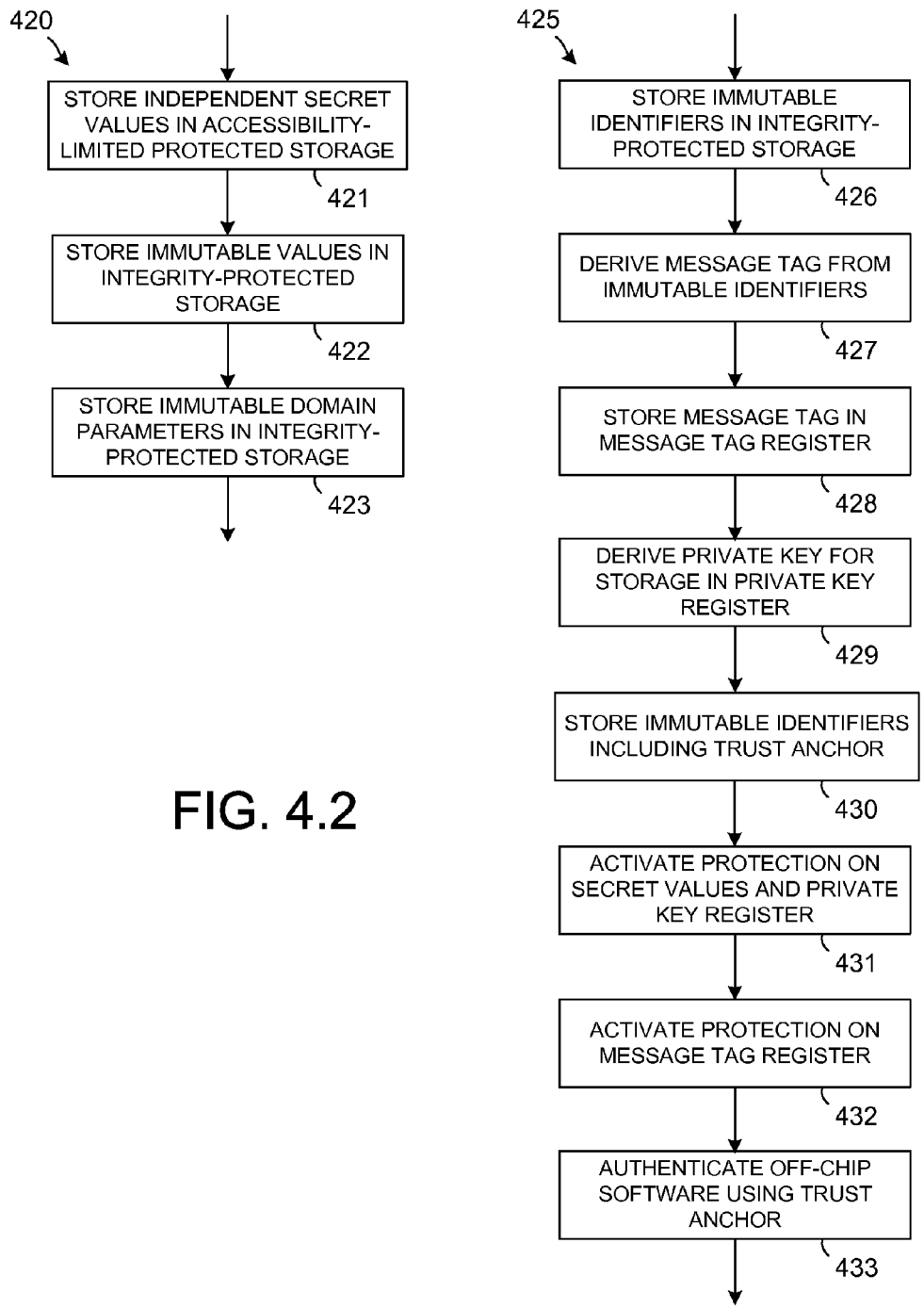
FIG. 4.2

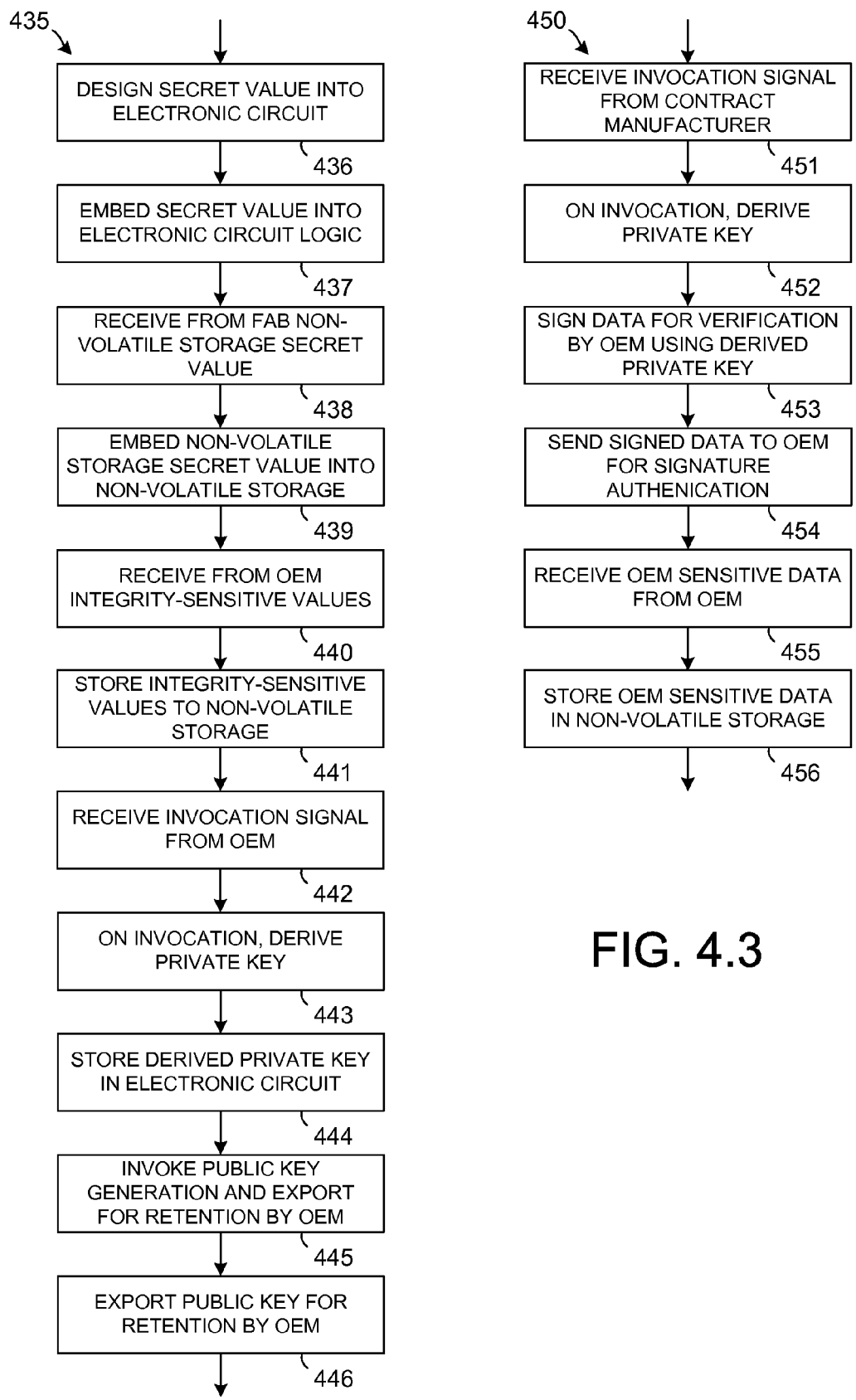
FIG. 4.3

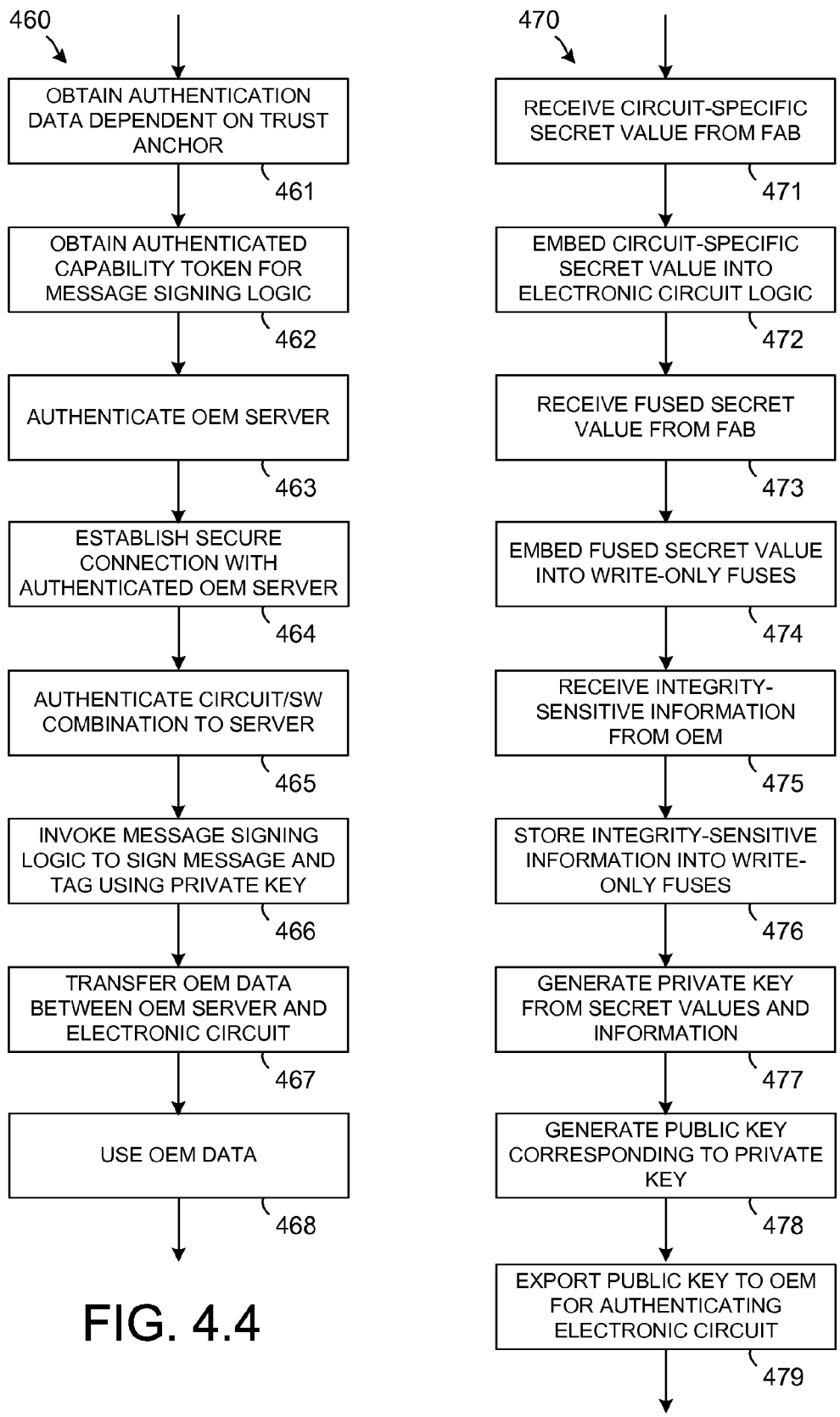
FIG. 4.4

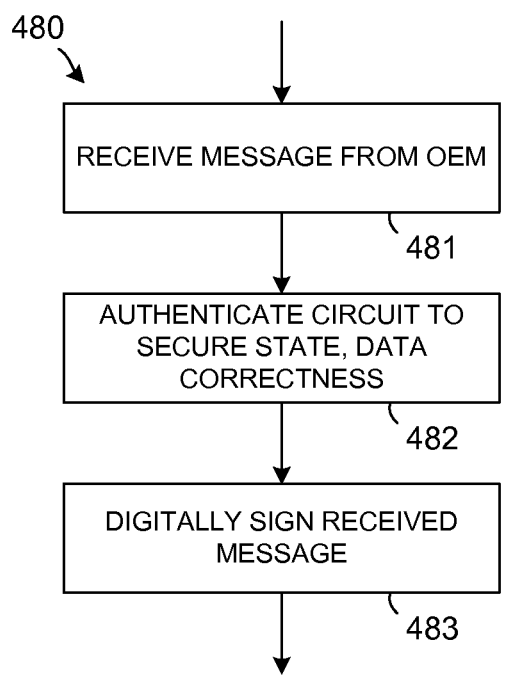
FIG. 4.5

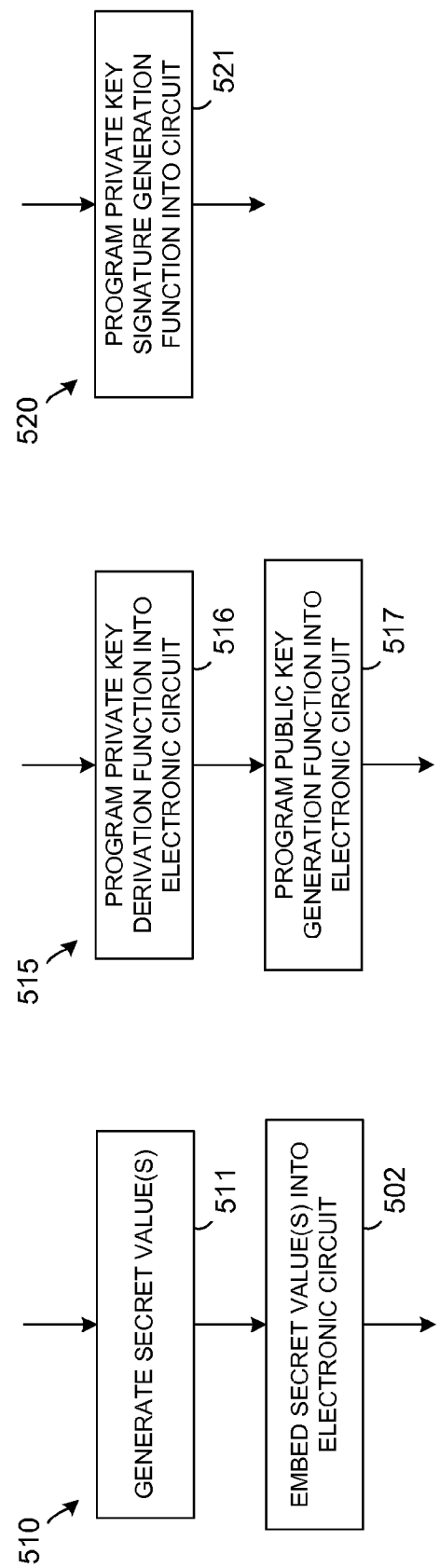
FIG. 5.1

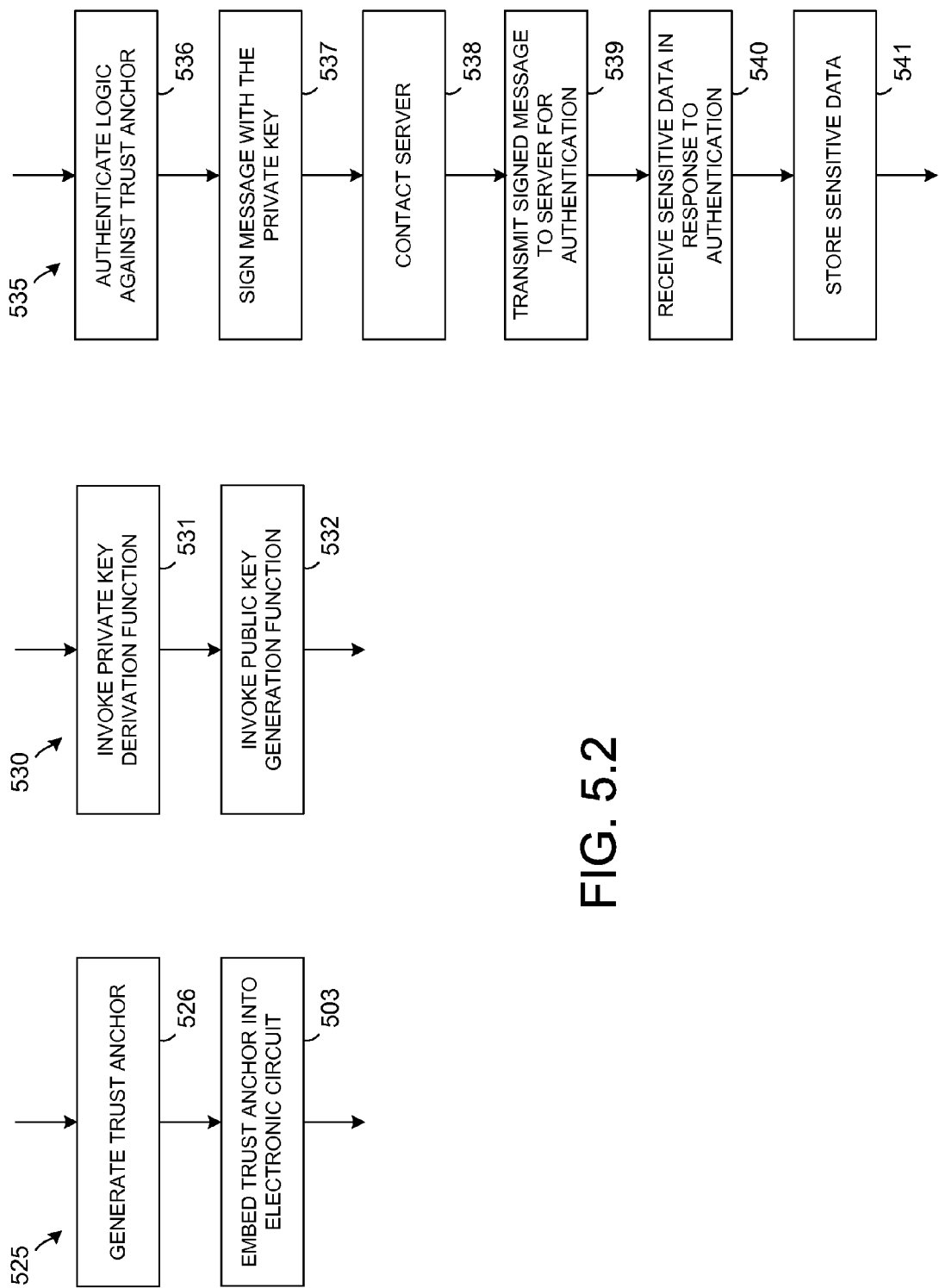
FIG. 5.2

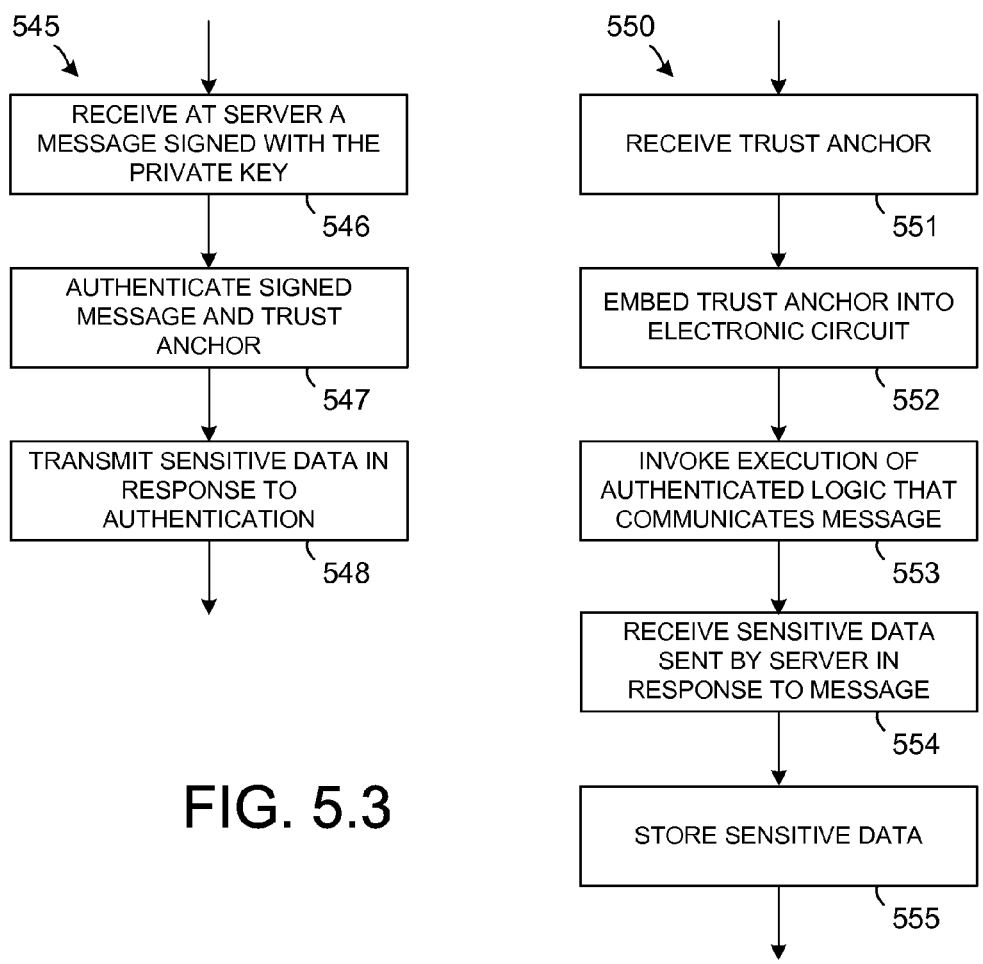
FIG. 5.3

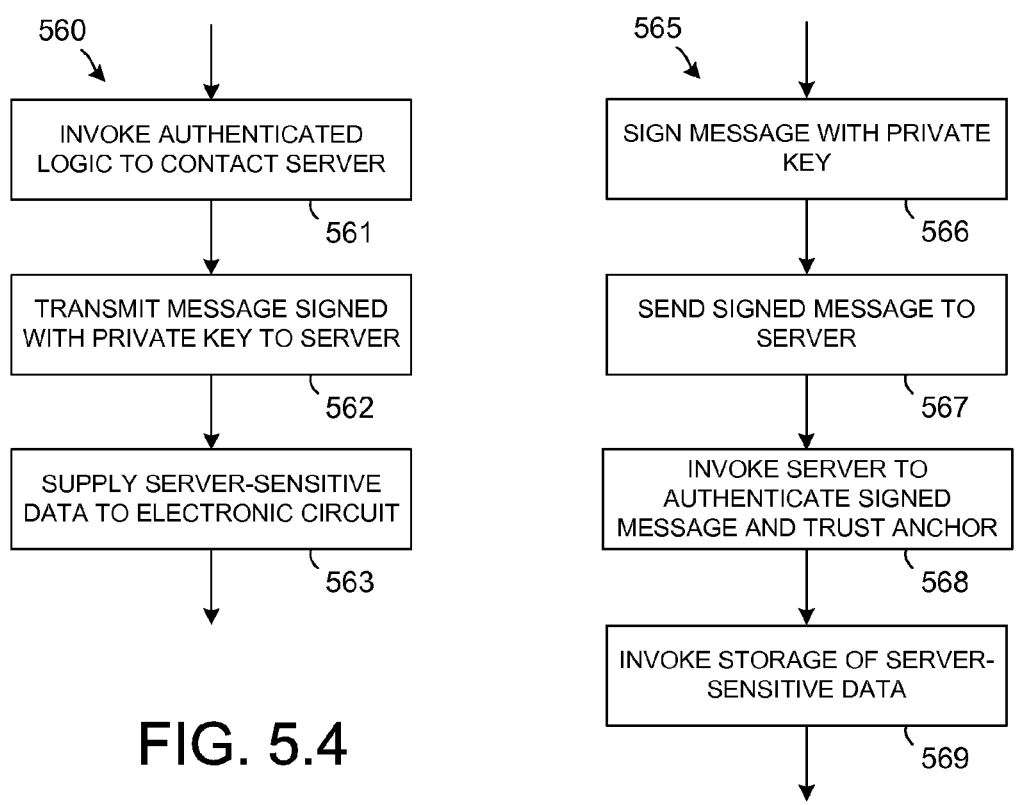
FIG. 5.4

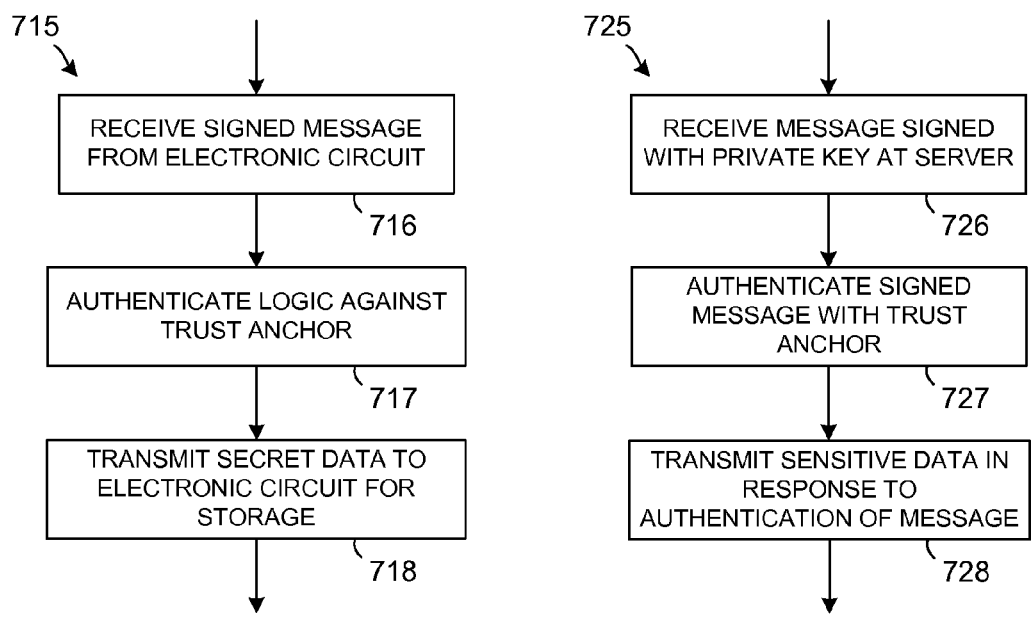
FIG. 7.1

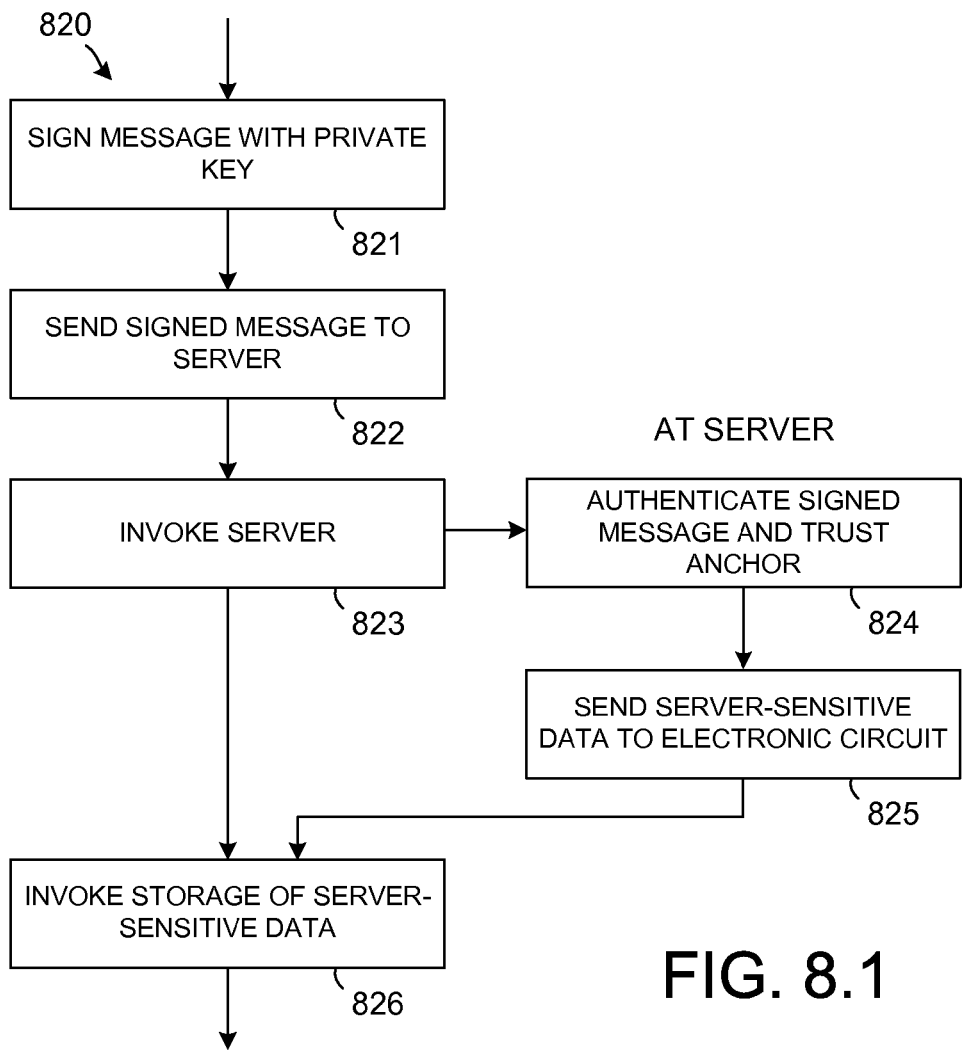
FIG. 8.1

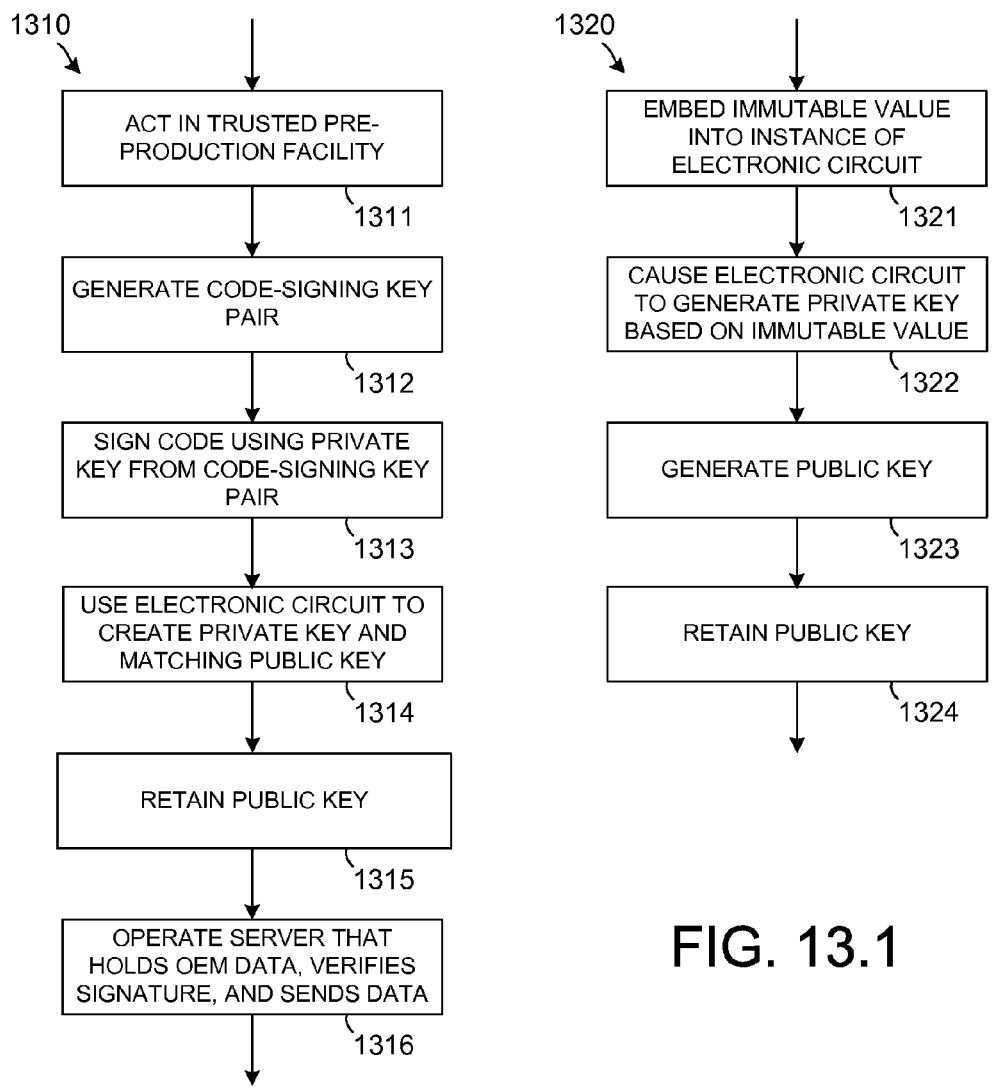
FIG. 13.1

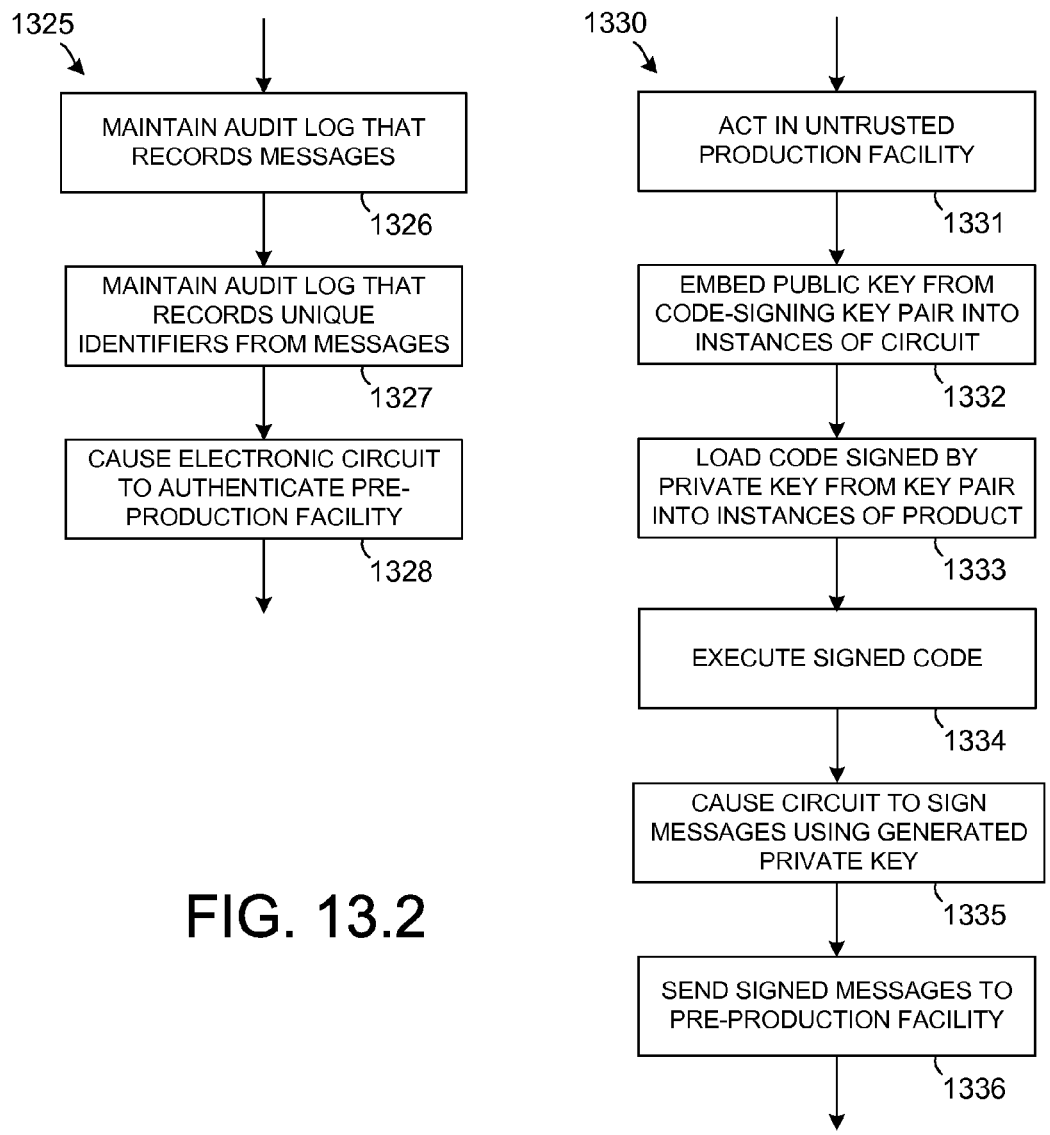
FIG. 13.2

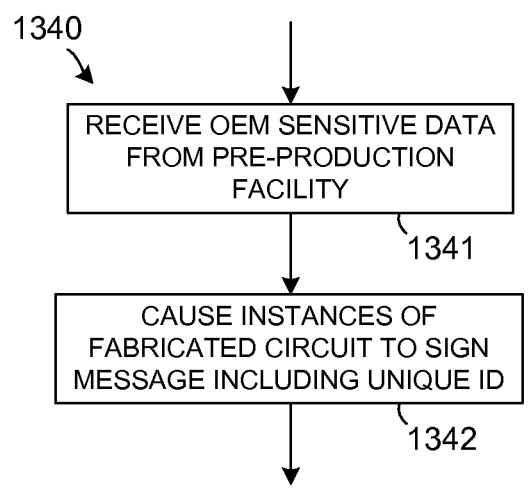
FIG. 13.3

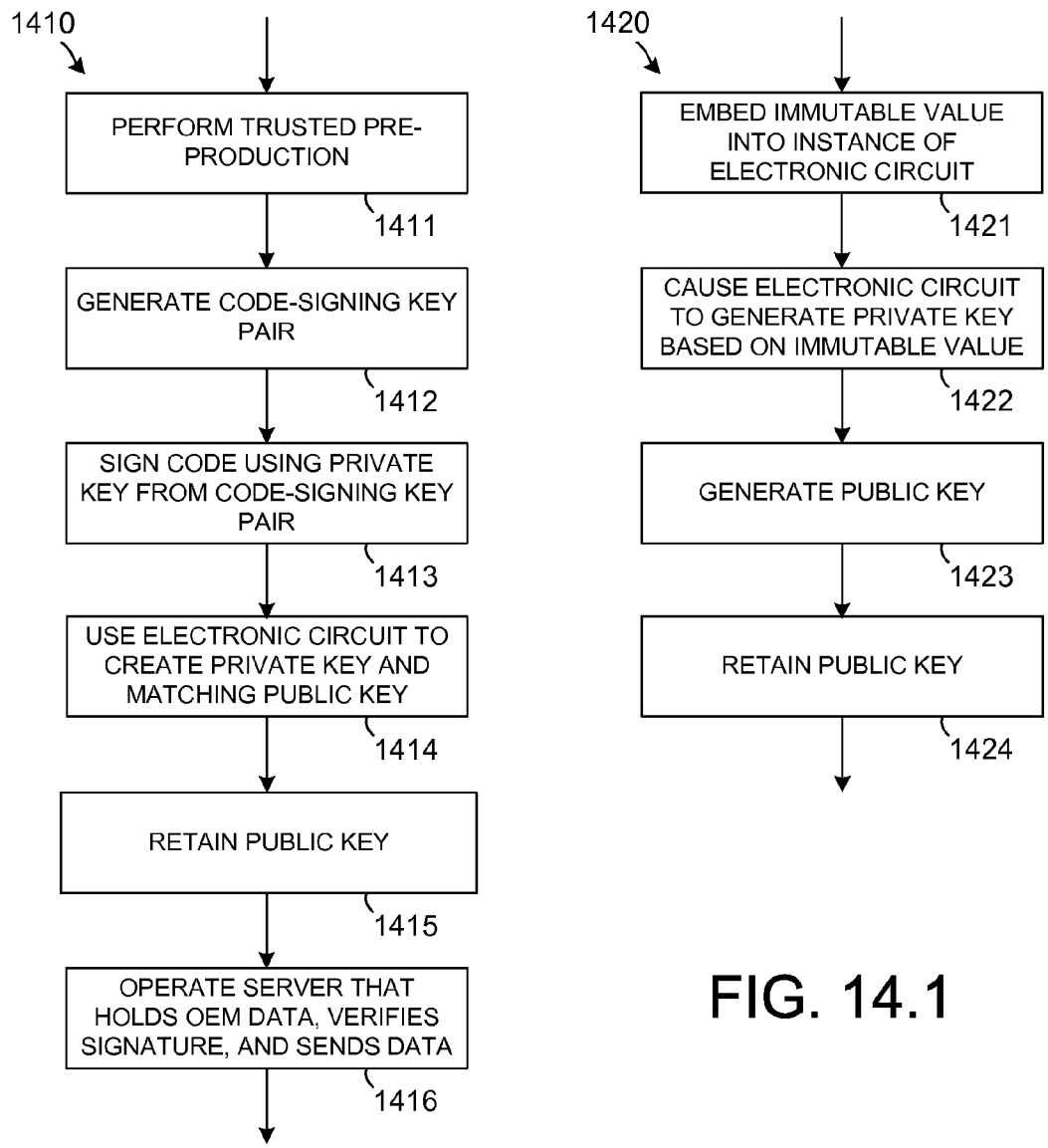
FIG. 14.1

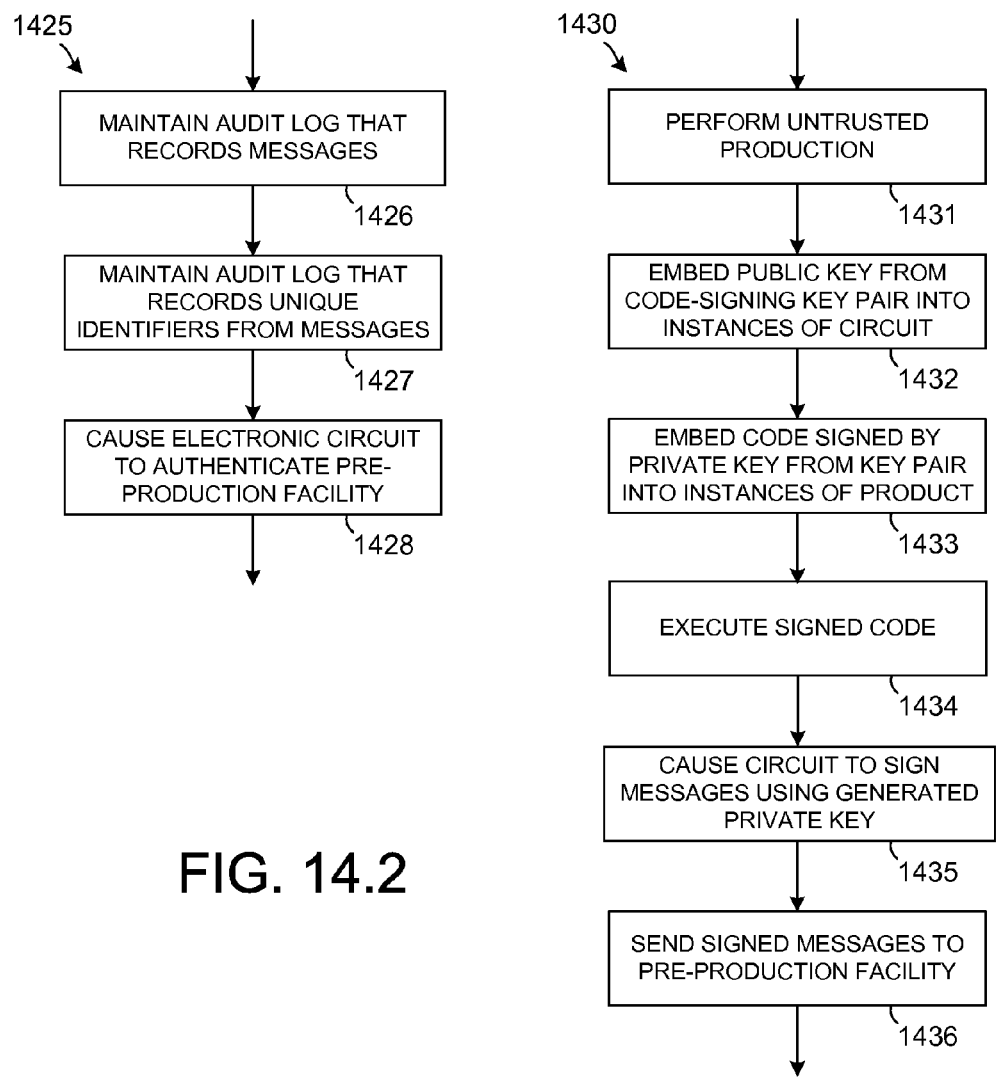
FIG. 14.2

SECURE PROVISIONING IN AN UNTRUSTED ENVIRONMENT

BACKGROUND

Cryptography can be used in data processing, information processing, computing system, or the like to secure operations and/or functions. Examples of cryptographic systems include secure email systems, smartcards, point of sales terminals, network routers, and the like including methods such as digital signatures, cryptographic hash functions, key management techniques, and the like. Cryptographic systems include cryptographic primitives of various levels of complexity.

Typical cryptographic systems include algorithms for key generation, encryption, and decryption. Ciphers refer to a pair of algorithms, one for encryption and one for decryption.

Cryptographic systems commonly use a key generation algorithm and often exploit public key techniques and/or symmetric key techniques.

BRIEF DESCRIPTION OF THE DRAWINGS

Embodiments of the invention relating to both structure and method of operation may best be understood by referring to the following description and accompanying drawings.

DETAILED DESCRIPTION

Original equipment manufacturers (OEMs) may desire to outsource manufacturing to a contract manufacturer. However, the OEM may not trust the manufacturer to build a product according to contract or only for the OEM. The manufacturer may build more product than the contract specifies and may sell products without knowledge of the OEM. The manufacturer may also release OEM secrets without authorization.

The systems, circuits, components, and techniques disclosed herein enable an OEM to allow products to be built by a contract manufacturer that is not fully trusted by the OEM, by verifying that the manufacturer builds only the quantity of product the OEM requests, and to guarantee that the manufacturer does not release OEM product design secrets. Some OEMs desire to purchase components such as electronic circuits or integrated circuit chips from distributors rather than directly from the chip fabricator, and have the components shipped directly to a contract manufacturer. The manufacturing process may require that critical OEM information be placed onto the components, information that is integrity and disclosure-sensitive. Provisioning data supplied by the OEM for use in an end product may include publicly readable data, such as feature-enabling data, but which must be integrity protected. Because the chips for different OEMs are allocated by the distributor, the chip fabricator may not know in advance which particular chips will be sent to the contracted manufacturer, and the OEM may never take possession or control of the chips, so that the chips cannot be customized or provisioned at the chip fabricator or at the OEM. However, the OEM may not trust the contract manufacturer to handle the sensitive OEM information correctly, or to refrain from over-producing OEM devices beyond contract limits using additional chips purchased by the manufacturer, or from claiming lower manufacturing yields than actually achieved.

Figure 1:
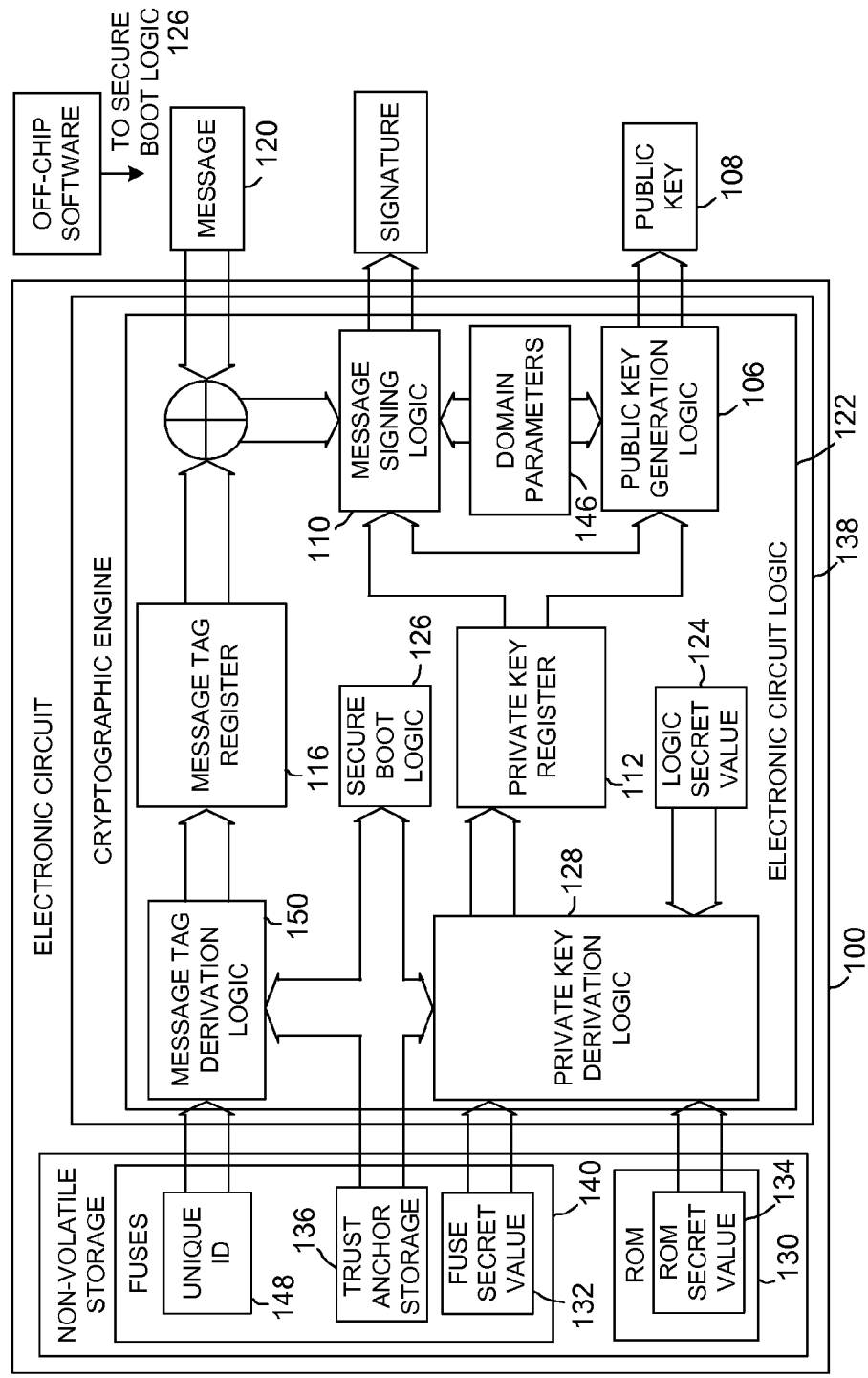
FIG. 1 is a schematic block diagram depicting an embodiment of an electronic circuit that enables security of sensitive data in a design and manufacturing process that includes multiple parties.

Referring to FIG. 1, a schematic block diagram depicts an embodiment of an electronic circuit 100 that enables security of sensitive data in a design and manufacturing process that includes multiple parties. An embodiment of an electronic circuit 100 can include private key derivation logic 128 that derives a private key from a plurality of components including at least one component known only to the electronic circuit 100 and residing either within the circuit logic 124, within fuses 132, or within ROM 134, or any combination of components residing in those locations. An embodiment of an electronic circuit 100 can also include public key generation logic 106 that generates a public key 108 to match the private key. The public key 108 is typically not stored inside the electronic circuit 100, but is written out to memory so that software can send the public key 108 off-chip. An embodiment of an electronic circuit 100 can also include message signing logic 110 that signs messages with the private key. An embodiment of an electronic circuit 100 can further include one or more immutable values that will be cryptographically bound into messages signed by the electronic circuit 100.

In an illustrative embodiment, FIG. 1 shows structures on the electronic circuit 100, for example an integrated circuit chip, as produced by a designer/fabricator. The electronic circuit 100 is purely static, including components and connections. The electronic circuit 100 includes trust anchor storage 136, as yet with no value. Similarly key and tag registers do not contain determined values. Off-chip items are shown for the purpose of describing the function of the on-chip logic of the electronic circuit 100. Any suitable arrangement of items on the electronic circuit 100 can be implemented. The depicted values in non-volatile storage, fuses, ROM, logic, and the like are illustrative of possible locations of storage on the electronic circuit 100. The arrangement enables different parties to provision different secret values.

In some embodiments, the electronic circuit 100 can include private key derivation logic 128 that derives the private key from multiple components including a trust anchor read from the trust anchor storage 136. When the message signing logic uses the private key to sign a message 120, the trust anchor is cryptographically bound into the signed message by virtue of having been used to derive the private signing key. The message 120 is not stored inside the electronic circuit 100, but is read from memory where the message 120 is assembled by software. The signature/signed message is also written out to memory for software to send off-chip, like the public key. In other embodiments, the electronic circuit 100 can include message tag derivation logic 150 that derives a message tag from the trust anchor read from trust anchor storage 137 and a unique ID 148. The message signing logic 110 can cryptographically bind the trust anchor and unique ID 148 into messages by incorporating the message tag in the message that is then signed by the message signing logic 110. In either case the trust anchor is cryptographically bound to the signed message.

The secret information used to derive the private key can be divided into multiple components. In some example embodiments, the secret can be arranged into three different components, one in logic gates 124, one in fuses 132, one in ROM 134, to form a split key. The three key splits can be combined to generate one secret value. Illustrative embodiments of the disclosed system, components, and technique may or may not include split keys, which are useful to increase the difficulty of reverse engineering the secret.

In a further embodiment, the electronic circuit 100 can include private key derivation logic 128, a private key register 112 that stores a private key configured to be writable exclusively by the private key derivation logic 128 and readable exclusively by the public key generation logic 106 and the message signing logic 110, a message tag register 116 that stores a message tag configured to be locked against subsequent changes, and message signing logic 110 that concatenates a received message 120 with the message tag read from the message tag register 116 and signs the concatenated message 120 and message tag with the private key read from the private key register 112. In other embodiments and/or applications, the electronic circuit 100 can include electronic circuit logic 122, a secret value 124 that is masked and etched into the private key derivation logic 128, secure boot logic 126 and a secret value 134 in on-chip masked read-only memory (ROM) 130, and a secret value 132 embedded by a fabrication facility into fuses 140. The logic-embedded secret value 124 is designed into the electronic circuit 100 and unknown and unknowable external to the electronic circuit 100. The secure boot logic 126 is permanently read-only and cannot be updated. The ROM secret value 134 is also be embedded into ROM 130, and is unknown and unknowable except by the secure boot logic 126. The fuse secret value 132 is distinct and common to the circuit-model copies of the electronic circuit 100 and unknown and unknowable except by the electronic circuit 100 and the secure boot logic 126.

According to further embodiments, the electronic circuit 100 can be configured such that the private key derivation logic 128 derives the private key from one or more independent secret values 124, 132, 134 and one or more immutable values including the trust anchor read from the trust anchor storage 136, and stores the derived private key in a protected register 112, preventing subsequent modification of the private key. In an illustrative embodiment, the derivation and storage of the private key can be implemented in a cryptographic engine or module 138 in conjunction with secure boot logic 126. In other embodiments, derivation and storage of the private key can be performed completely within the cryptographic engine 138 which can fetch all input values for key derivation. The term "independent" in the independent secret value 124, 132, 134 means that different parties can generate and provision the secret values with no party having access to multiple secret values. In various embodiments, the electronic circuit 100 can store the one or more independent secret values 124, 132, 134 in various types of accessibility-limited protected storage such as one or more of a Register Transfer Level (RTL) secret 124 permanently wired into circuit logic such as the private key derivation logic 128, a ROM value 134 permanently masked into on-chip ROM 130 (for example ROM, EPROM, or flash), a fuse value 132 burned into on-chip fuses 140 such that multiple secrets are independently provisioned by multiple parties, and the like.

In an example embodiment, the electronic circuit 100 can be a system on a chip (SOC) based on a suitable processor such as a PowerPC, ARM, or the like. The SOC typically includes one or more processors, an interface to peripherals, memory controllers, a network port such as an Ethernet port, Universal Serial Bus (USB), serial ports, and the like. The SOC electronic circuit 100 can include a cryptographic engine 138, for example a cryptographic accelerator module, that implements the various aspects of the disclosed security protection. The cryptographic engine 138 can include a random number generator, encryption hardware blocks, a hashing hardware block, a public key accelerator block, and other cryptographic functionality.

In further embodiments, the electronic circuit 100 can include one or more immutable domain parameters 146 in integrity-protected storage such as an RTL value permanently wired into circuit logic such as public key derivation logic 106 or message signing logic 110, a ROM value permanently masked into on-chip ROM 130 (EPROM or flash can otherwise be used but are less integrity-protected), or a fuse value burned into on-chip fuses 140. In some embodiments and/or applications, public key cryptographic techniques can include elliptic curve cryptography (ECC) based on the algebraic structure of elliptic curves over finite fields. To use ECC, participating parties agree on elements defining the elliptic curve that are specified as domain parameters 146 of the cryptographic scheme. The domain parameters 146 can include one or more field parameters and constants defining the elliptic curve.

Figure 2:
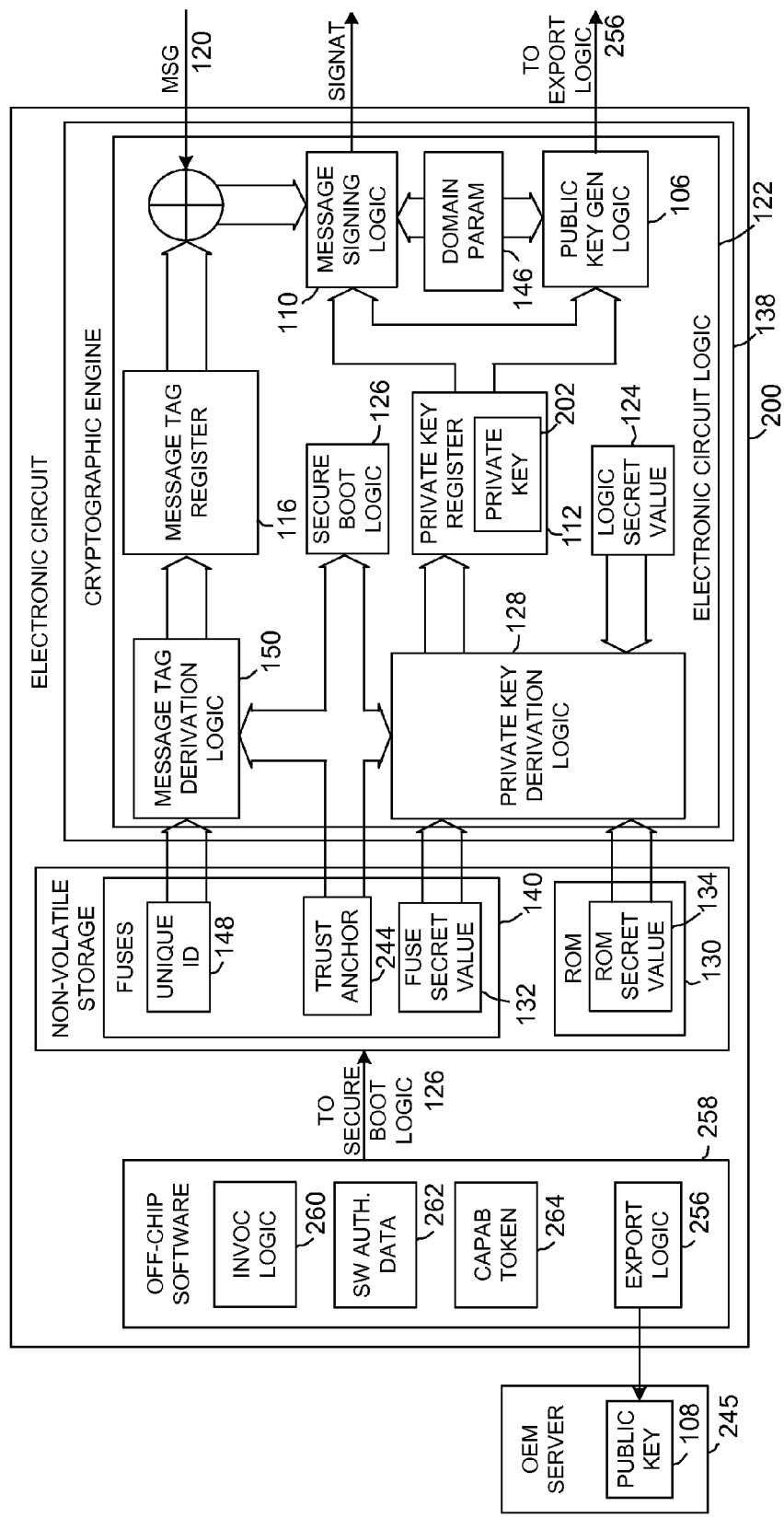
FIG. 2 is a schematic block diagram showing an embodiment of an electronic circuit for securing sensitive data in a multiple-party design and manufacturing process that includes an OEM.

Referring to FIG. 2, a schematic block diagram shows an embodiment of an electronic circuit 200 for securing sensitive data in a multiple-party design and manufacturing process that includes an OEM. Thus in some embodiments, the electronic circuit 200 can include at least one immutable value including an OEM trust anchor 244 that is burned into on-chip fuses 140. In some embodiments and/or applications, the electronic circuit 200 can include one or more chip-unique identifiers and/or immutable values 148, a message tag register 116 for storing a message tag that is locked against subsequent modification, and message tag logic 150. The message tag logic 150 can derive a message tag from the one or more chip-unique identifiers 148 and other immutable values such as a trust anchor, store the message tag in the message tag register 116, and prevent subsequent modification of the message tag.

In an example embodiment, FIG. 2 shows structures and function of the electronic circuit 200 during OEM pre-production. The trust anchor value 244 and off-chip software 258 are provisioned using suitable tools (not shown). Software authentication data 262 can include, for example, a signature and full keys (if the trust anchor is a hash). A capability token 264 stops secure boot clearing of the private key. Invocation logic 260 runs after secure boot and invokes public key generation.

The trust anchor 244 is an authoritative entity in cryptography that is represented via a public key or the hash of a public key and associated data, for example used in the context of public key infrastructures and digital certificates. In a chain of trust, generally the first entity to be trusted becomes the trust anchor. The trust anchor must be fixed, not allowed to be changed and can be stored in fuses 140. The public key associated with the trust anchor 244 is used to verify digital signatures and the associated data. The public key is used to constrain the types of information for which the trust anchor 244 is authoritative. A relying party uses trust anchors to determine whether a digitally signed object is valid by verifying a digital signature using the trust anchor's public key, and by enforcing the constraints expressed in the trust anchor's associated data.

In an example system, integrated circuit chips from an electronic circuit designer and/or fabricator can have a first chip-specific secret embedded into logic gates, and a second chip-specific secret burned into write-only fuses. The OEM can burn an immutable value, that is integrity-sensitive information, for example a trust anchor into fuses in one instance of the chip from the electronic circuit designer/fabricator. A trust anchor may be a code-signing public key, or the hash of a code-signing public key, or other value derived from a code-signing public key (or some other value). In hardware, the chip can generate the message-signing private key 202 from the first chip-specific secret, the second chip-specific secret and the immutable value, and then generate the corresponding message-signing public key 108. The OEM retains the public key 108 for use in authenticating the chips and for verifying that the chip's immutable value is in fact the OEM trust anchor.

The chip, for example electronic circuit 200, can also digitally sign messages that attest that the chip is authorized by the electronic circuit designer and/or manufacturer, runs in a secure state, and that the OEM trust anchor is correct. The OEM can verify the authenticity of the message using the previously generated message-signing public key 108.

In additional embodiments, the electronic circuit 200 can include a private key register 112, private key derivation logic 128, at least one chip-unique identifier 148, and secure boot logic 126. The private key derivation logic 128 derives a private key 202 for storage in the private key register 112. The secure boot logic 126 can be configured to copy secret values to the private key derivation logic 128 and activate confidentiality protection on copied secret values and the private key register 112, copy chip-unique identifiers 148 and the trust anchor 244 to the message tag logic 150 and activate protection on the message tag register 116, and authenticate off-chip software using the trust anchor 244, thereby preventing use of the message signing logic 110 unless the off-chip software is authenticated and contains the correct capability token for authorizing use and capability of the software. In a typical embodiment, secure boot logic 126 runs prior to executing off-chip software. In various implementations, actions of the secure boot logic 126 can be performed in various other electronic circuit elements or components, although the secure boot logic 126 efficiently performs the actions and can be selected based on considerations of convenience. The trust anchor 244 can be burned in on-chip fuses 140 and is the same value that is used in private key derivation. Otherwise, a contract manufacturer could use the OEM trust anchor 244 for the private key 202 and their own trust anchor for manufacturing software authentication, in which their own manufacturing software mishandles the OEM sensitive data. Message signing logic 110 cannot be allowed to generate a valid signature unless the secure boot operation succeeds, for example in that the signature over the off-chip software is validated correctly with respect to the trust anchor 244 burned into fuses. Otherwise, malicious software can successfully run a challenge/response protocol and obtain OEM sensitive data from the server 245.

During manufacturing, the contracted manufacturer sends a signed message to the OEM's server 245 to obtain provisioning secrets or other sensitive data to be provisioned on the device 200. If the manufacturer fails to burn the OEM trust anchor 244 correctly, or attempts to generate a signed message using a non-authorized chip, the private key 202 will not be correct, the signature will fail to verify against the previously generated public key, and the OEM's server 245 will detect an invalid request for the provisioning secrets or other sensitive data.

If the trust anchor 244 is used for private key derivation or if the trust anchor 244 is included as part of the signed message, the OEM's server 245 can verify that the trust anchor 244 is correct and that the chip is running signed OEM provisioning software. The OEM can be assured that the OEM-supplied secrets or OEM-sensitive information are properly handled. The signed message can include a unique ID 248 previously burned into fuses by the electronic circuit designer and/or fabricator to aid in auditing the manufacturing and provisioning processes.

During manufacturing, the contracted manufacturer is required to burn the correct trust anchor 244 and run the correct signed OEM provisioning code. The OEM provisioning code communicates with an OEM server to obtain sensitive data to be embedded in the product, allowing secure embedding of sensitive data, as well as auditing of the manufacturing process. Any attempt by the manufacturer to act in a manner not desired by the OEM is detectable by the OEM.

Embodiments of the electronic circuit 200 can include a private key register 112, a message tag register 116, signing logic 110, at least one immutable value such as the trust anchor 244, private key derivation logic 128, and export logic 256. The private key register 112 stores a private key 202 configured to be writable exclusively by the private key derivation logic 128 and readable exclusively by the public key generation logic 106 and the message signing logic 110. The message tag register 116 stores a message tag. The signing logic 110 concatenates a received message 120 with the message tag and signs the concatenated message 120 and message tag with the private key 202. The off-chip software authentication via secure boot logic 126 depends on the one or more integrity-sensitive or immutable values. Off-chip software authentication may or may not depend on the chip-unique identifiers and other values. The immutable value is the trust anchor 244 or includes the trust anchor 244. The private key derivation logic 128 derives the private key 202 from (1) the logic-embedded secret value 124 (the logic-embedded secret value is embedded in logic (RTL), not fuses), (2) the non-volatile storage-embedded (fuse) secret value 124, and (3) the one or more immutable values including at least the trust anchor 244, and embeds the derived private key 202 within the electronic circuit 200. Logic in off-chip software exports the public key 108, generated to match the private key 202, to the OEM for retention by the OEM. In some embodiments, the immutable value can be a trust anchor 244 represented by the hash of a code-signing public key. The OEM-supplied software authentication via secure boot depends on the same trust anchor 244, as the export logic 256 that exports the public key 108 generated to match the message-signing private key 202 for retention by the OEM, thus assuring the OEM server 245 that both the chip hardware and the software running on the OEM server 245 are authentic when verifying the signed message. The OEM, upon retrieving the public key, has physical control of the integrated circuit and does not need assurance about what software is running. The logic may require signing and a capability token to prevent the private key from being erased before the public key can be generated. With regard to the one or more integrity-sensitive values, the OEM cannot program the masked ROM, thus the trust anchor 244 can be programmed, for example, in on-chip fuses 140.

In further embodiments and/or applications, the electronic circuit 200 can include one or more off-chip components 258 for use in OEM pre-production including invocation logic 260 that invokes public key generation and export for retention. Optionally, the off-chip component or components 258 further can include software authentication data 262 and a capability token 264 for testing. None of the off-chip components 258 can modify the private key 202 and message tag.

Figure 3:
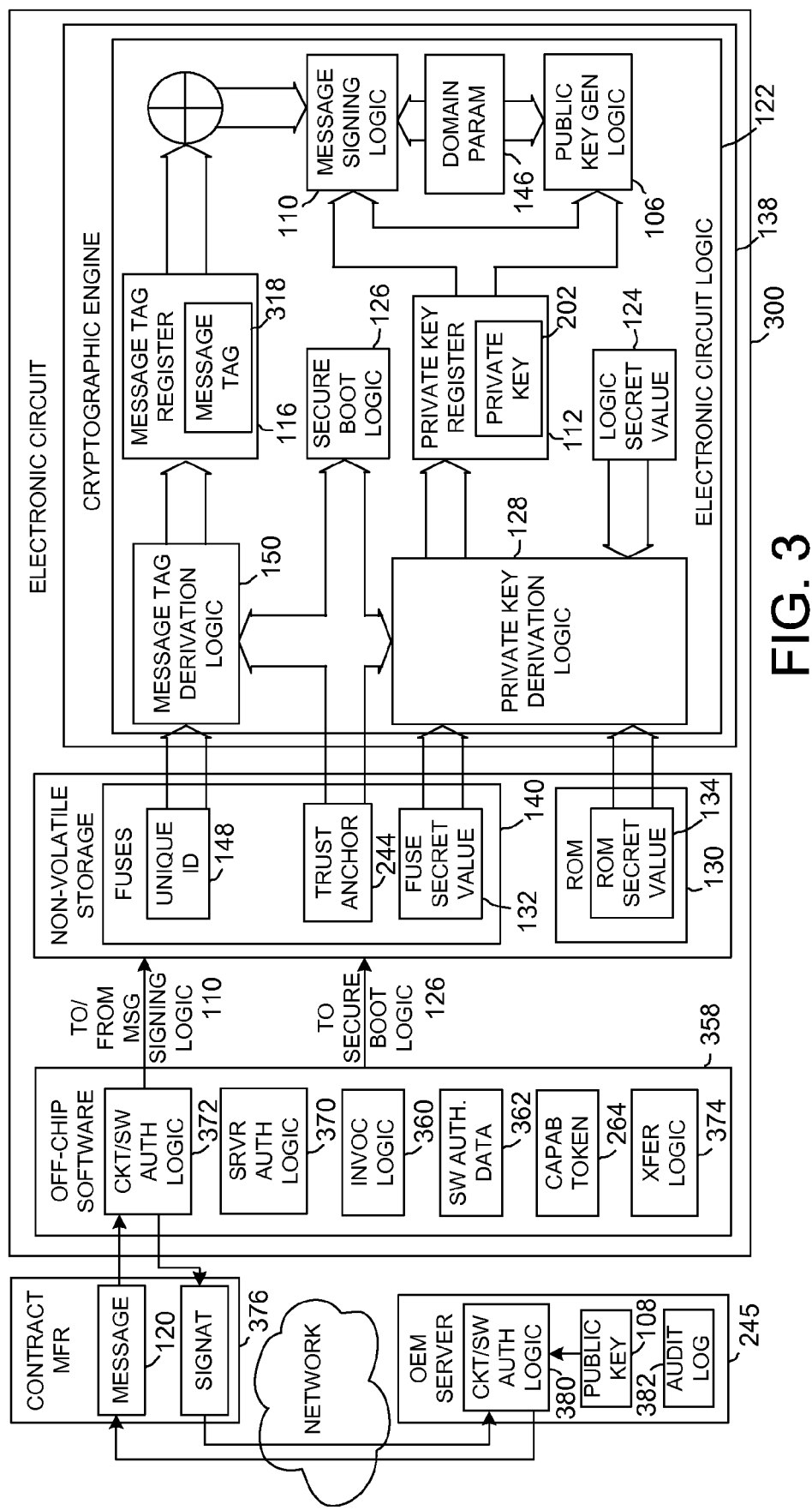
FIG. 3 is a schematic block diagram illustrating an embodiment of an electronic circuit for securing sensitive data in a multiple-party design and manufacturing process that includes a contract manufacturer.

Referring to FIG. 3, a schematic block diagram illustrates an embodiment of an electronic circuit 300 for securing sensitive data in a multiple-party design and manufacturing process that includes a contract manufacturer 376. Accordingly, in a further embodiment, the electronic circuit 300 can include invocation logic 360, and circuit and software authentication logic 372. The invocation logic 360 is activated by a contract manufacturer 376 to derive the private key 202 from (1) the logic-embedded secret value 124, (2) the non-volatile storage-embedded secret value 132, (3) the ROM-embedded secret value 134, and (4) the one or more immutable values including at least the trust anchor 244 and the unique ID 248. The invocation logic 360 can sign data using the derived private key 202 for verification by the OEM. The circuit/software authentication logic 372 sends the signed message to the OEM for authentication and verification of the signed data using the public key 108. The transfer logic 374 receives sensitive OEM data. The transfer logic 374 for communicating with the OEM server 245 can be contained in the OEM-supplied software, not in the electronic circuit logic, fuses or ROM. The sensitive OEM data might call for integrity rather than, or as well as, confidentiality.

In an illustrative embodiment, FIG. 3 shows the electronic circuit 300 during contracted manufacturing. The trust anchor value 244 and off-chip software 358 are provisioned using tools (not shown). Circuit and software authentication logic 372 invokes message tagging and signing and passes a message/signature between the OEM server and the electronic circuit 300. At the contracted manufacturing stage, the private key value 202 is contained in the private key register 112, and the message tag value 318 is contained in the message tag register 116.

In another embodiment or embodiments, the electronic circuit 300 can include authentication data 362, server authentication logic 370, circuit and software authentication logic 372, and transfer logic 374. The authentication data 362 is dependent on a trust anchor 244, which is a reference metric used to authenticate the OEM-supplied software 358 that will be executed on the electronic circuit 300. Data residing within the electronic circuit 300 can include a capability token that is authenticated and allows use of the private key generation logic 128 or the message signing logic 110. The server authentication logic 370, which may be embedded in the OEM-supplied software 358, authenticates an OEM server 245 and establishes a secure connection with the authenticated OEM server 245. The circuit and software authentication logic 372 authenticates the electronic circuit 300 and software 358 combination to the server 245 using a protocol, which may be a challenge/response protocol, including invoking the message signing logic 110 to sign a message 120 including a message tag 118 with a private key 202. After mutual authentication between the electronic circuit 300 and the OEM server 245, the transfer logic 374 transfers sensitive OEM data between the OEM server 245 and electronic circuit 300 over a secure connection. The authentication data 362, server authentication logic 370, circuit and software authentication logic 372, and transfer logic 374 are typically off-chip software components for use in manufacturing. The server authentication logic 370 performs server authentication that is used to ensure a contracted manufacturer does not tamper with OEM sensitive data by techniques such as supplying known cryptographic keys. An example is Transport Layer Security (TLS) server authentication, although any suitable server authentication can be used. The circuit and software authentication logic 372 performs client authentication that is used to ensure the contracted manufacturer does not obtain OEM sensitive data from the server 245 by deception. Inclusion of the trust anchor 244 in private key derivation indirectly authenticates the software via secure boot. Any suitable challenge/response protocol can be used. The OEM sensitive data can be used by the transfer logic 374 in various ways. The OEM data can be stored in fuses, encrypted and stored off-chip, or not even stored but used to bootstrap some higher-level security protocol with another server. Other off-chip software components can be used in shipping devices including, for example, (1) other authentication data dependent on a trust anchor 244, (2) a capability token allowing use of the chip signature logic, or, (3) other useful logic. In some cases, the shipping software can be allowed to use the chip signature logic, but in many cases the shipping software is prevented, such as by withholding a capability token, from running the challenge/response protocol that would allow access to OEM sensitive data. OEM server components can include (1) logic (not shown) to authenticate to client (usually requiring a server private key) and establish a secure connection, (2) a copy of the message-signing public key 108 generated during pre-production, (3) circuit/software authentication logic 380 to run a challenge/response protocol using the message-signing public key 108, (4) an audit log 382 to record transactions with clients for auditing or fraud detection using message tags 118 embedded in signed responses (the main purpose of the message tag 118), and (5) logic (not shown) to transmit OEM sensitive data if mutual authentication and a secure connection are established.

Logic in the OEM server 245 for monitoring and recording transactions with clients for auditing or fraud detection enable the OEM to ensure that the manufacturer makes only the contracted amount of product. For example, when a message is sent to the chip for signing, the chip also includes a chip-unique identifier such as a serial number, a time and date stamp specifying manufacture of the chip, an identifier of wafer lot, X/Y coordinates on the wafer, and the like. The chip-unique identifier 148 can be a public value that is burned into every chip and guaranteed to be different for each chip. The chip-unique identifier 148 is a known or public value that is guaranteed to be distinct on each chip. When the OEM requests a chip to sign the message, the chip can append the chip-unique identifier 148 to the message before signing and reply with the chip-unique identifier 148 along with the signature to enable the OEM to append the chip-unique identifier 148 to the message and check the validity of the signature or the combination. The chip-unique identifier 148 facilitates auditing. When a chip in a product communicates with the OEM and signs the message, the OEM can log the chip-unique identifier 148. The OEM can track authorized chip-unique identifiers 148. When the OEM server 245 receives a signed message with a chip-identifier that is not authorized but for which the signature is correct, the OEM can detect that the manufacturer has built product beyond that specified by contract.

In another embodiment and/or application, the OEM can provision a unique and distinct device key onto each chip. For example, a High-Definition Multimedia Interface (HDMI) on a chip can have a specific device key. By binding a serial number to a protocol, the OEM can maintain a log of each chip that receives an HDMI key. The auditing capability enables the OEM to perform many security operations.

Communications between the OEM server and the contracted manufacturer are typically made over network communication during the manufacturing process. Typically, at the end of the manufacturing process and after the OEM has injected the sensitive data, the chip erases the message-signing private key and can no longer sign messages. The OEM-signed code is provisioning code that is run only in the manufacturing process and is generally replaced with OEM-signed production code that is sent into the field in the product. The production code deletes the message-signing private key so a part in the field cannot participate in the authentication process.

Figure 4:
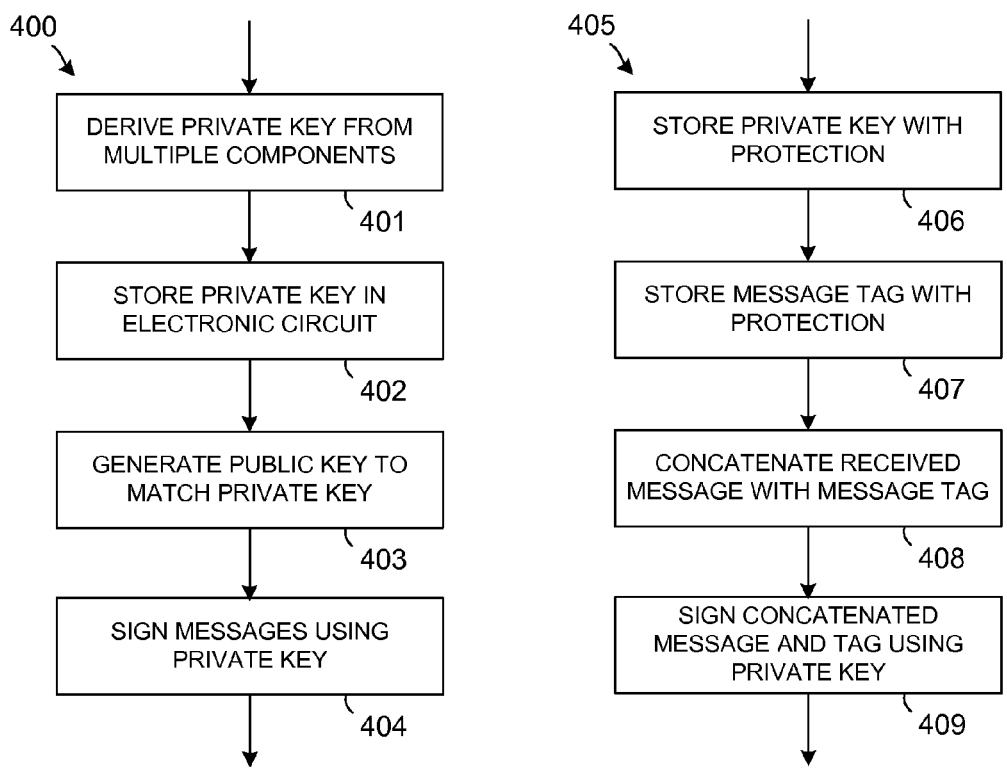
FIG. 4, including FIGS. 4.1, 4.2, 4.3, 4.4, and 4.5, are schematic flow charts showing an embodiment or embodiments of a method of operating an electronic circuit that enables security of sensitive data in a design and manufacturing process that includes multiple parties.

FIG. 4, including FIGS. 4.1, 4.2, 4.3, 4.4, and 4.5, are schematic flow charts showing an embodiment or embodiments of a method of operating an electronic circuit that enables security of sensitive data in a design and manufacturing process that includes multiple parties. The illustrative method 400 of operating an electronic circuit includes deriving 401 a private key from a plurality of components including one or more components known only to the electronic circuit and one or more immutable values cryptographically bound into messages and residing on the electronic circuit, storing 402 the private key within the electronic circuit, generating 403 a public key to match the private key, and signing 404 messages with the private key.

In a further embodiment, the method 405 of operating an electronic circuit further includes storing 406 a private key that is writable exclusively by the private key derivation logic and readable exclusively by the public key generation logic and the message signing logic, storing 407 a message tag configured to be locked against subsequent changes, concatenating 408 a received message with the message tag, and signing 409 the concatenated message and message tag with the private key. In other embodiments and/or applications, the method 410 of operating an electronic circuit can further include designing 411 a logic-embedded secret value into the electronic circuit that is unknown and unknowable external to the electronic circuit, and embedding 412 the logic-embedded secret value into electronic circuit logic such that the secret value is masked and etched into the electronic circuit logic. The method 410 can further include receiving 413 from the fabrication facility a non-volatile storage-embedded secret value that is distinct and common to circuit-model copies of the electronic circuit and unknown and unknowable except by the electronic circuit and secure boot logic, and embedding 414 the non-volatile storage-embedded secret value into fuses or on-chip masked ROM that is permanently read-only and cannot be updated.

In some embodiments, the method 415 of operating an electronic circuit further includes deriving 416 the private key from one or more independent secret values and one or more immutable values, storing 417 the derived private key in a protected register, preventing subsequent modification of the private key, and preventing 418 subsequent access to the one or more independent secret values and preventing over-writing of the one or more immutable values. In additional embodiments, the method 420 of operating an electronic circuit further includes storing 421 one or more independent secret values in protected storage such as RTL permanently wired into circuit logic, a ROM permanently masked on-chip, EPROM, or flash, or on-chip fuses, or the like, such that the values are accessible only to internal hardware and such that multiple secrets can be independently provisioned by multiple parties. The method 420 can further include storing 422 into on-chip fuses one or more immutable values including a trust anchor configured as a code-signing public key or hash of a code-signing public key, and storing 423 in integrity-protected storage such as an RTL value permanently wired into circuit logic, a ROM value permanently masked into on-chip ROM, EPROM, or flash, or a fuse value burned into on-chip fuses, or the like, one or more immutable domain parameters selected from one or more of such domain parameters.

In some embodiments and/or applications, the method 425 of operating an electronic circuit can further include storing 426 one or more chip-unique identifiers in integrity-protected storage, deriving 427 a message tag from the one or more chip-unique identifiers, and storing 428 a message tag in a message tag register, thereby preventing subsequent modification of the message tag. The method 425 further includes deriving 429 a private key for storage in the private key register, storing 430 one or more chip-unique identifiers in integrity-protected storage including a trust anchor configured as a code-signing public key that is burned into on-chip fuses, activating 431 confidentiality protection on copied secret values and the private key register, activating 432 integrity protection on the message tag register, and authenticating 433 off-chip software using the trust anchor, and preventing use of the message signing logic unless the off-chip software is authenticated and contains a correct capability token.

In various embodiments, the method 435 of operating an electronic circuit can further include designing 436 a logic-embedded secret value into the electronic circuit, embedding 437 the logic-embedded secret value into electronic circuit logic, receiving 438 from the fabrication facility a non-volatile storage-embedded secret value, and embedding 439 the non-volatile storage-embedded secret value into non-volatile storage. The logic-embedded secret value is masked and etched into the electronic circuit logic and unknown and unknowable external to the electronic circuit. The non-volatile storage-embedded secret value is distinct and common to circuit-model copies of the electronic circuit and unknown and unknowable except by the electronic circuit and secure boot logic in on-chip masked ROM that is permanently read-only and cannot be updated. The method 435 of operating an electronic circuit can further include receiving 440 from an OEM one or more integrity-sensitive values, storing 441 the one or more integrity-sensitive values to the non-volatile storage in one or more circuit-model copies of the electronic circuit, receiving 442 an invocation signal from the OEM, and deriving 443, upon invocation by the OEM, the private key. The one or more integrity-sensitive values are configured such that OEM-supplied software authentication via secure boot depends on the one or more integrity-sensitive values. The private key is derived 443 from (1) the logic-embedded secret value, (2) the non-volatile storage-embedded secret value, and (3) the one or more integrity-sensitive values. The method 435 of operating an electronic circuit can further include storing 444 the derived private key within the electronic circuit, invoking 445 public key generation and export for retention using one or more off-chip components, and exporting 446 the public key generated to match the private key for retention by the OEM for use in OEM pre-production.

In further embodiments and/or applications, the method 450 of operating an electronic circuit further includes receiving 451 an invocation signal from a contracted manufacturer, and deriving 452 the private key upon invocation by the contracted manufacturer. The private key is derived 452 from (1) the logic-embedded secret value, (2) the non-volatile storage-embedded secret value, and (3) the one or more immutable values. The method 450 of operating an electronic circuit can further include signing 453 data using the derived private key for verification by the OEM, sending 454 the signed data to the OEM for authentication and verification of the signed data using the public key, receiving 455 OEM sensitive data from the OEM, and storing 456 the OEM sensitive data in the non-volatile storage.

In some further embodiments, the method 460 of operating an electronic circuit can further include obtaining 461 authentication data dependent on a trust anchor, obtaining 462 a capability token that is authenticated and allows use of the private key derivation logic or message signing logic, and authenticating 463 an OEM server. The method 460 of operating an electronic circuit can further include establishing 464 a secure connection with the authenticated OEM server, and authenticating 465 the electronic circuit and software combination to the server using a protocol including invoking 466 the message signing logic to sign with a private key a message including a message tag. The protocol can be a challenge/response protocol in which the OEM server supplies a nonce or timestamp that the message signing logic must include in the signed message. The method 460 of operating an electronic circuit can further include transferring 467 sensitive OEM data between the OEM server and electronic circuit over a secure connection after mutual authentication, and then using 468 the sensitive OEM data.

In other embodiments and/or applications, the method 470 of operating an electronic circuit can further include receiving 471 a circuit-specific logic-embedded secret value from a fabrication facility, embedding 472 the circuit-specific logic-embedded secret value into electronic circuit logic, receiving 473 a fuse-embedded secret value from the fabrication facility, and embedding 474 the fuse-embedded secret value into write-only fuses. The method 470 of operating an electronic circuit can further include receiving 475 integrity-sensitive information from an OEM, storing 476 the integrity-sensitive information into the write-only fuses, and generating 477 the private key. The private key can be generated 477 from (1) the circuit-specific logic-embedded secret value, (2) the fuse-embedded secret value, and (3) the integrity-sensitive information. The method 470 of operating an electronic circuit can further include generating 478 the public key corresponding to the private key, and exporting 479 the public key to the OEM for authenticating the electronic circuit and the integrity-sensitive information.

In some embodiments, the method 480 of operating an electronic circuit further includes receiving 481 a message from an OEM, authenticating 482 the electronic circuit, and digitally signing 483 the message for an authenticated electronic circuit. Authentication 483 prevents use of message signing logic in the electronic circuit unless the message is authenticated and contains the correct capability token for authorizing use and capability of the message or associated software. For example, the OEM server sends a message to the device, which authenticates the circuit and signs the message.

Figure 5:
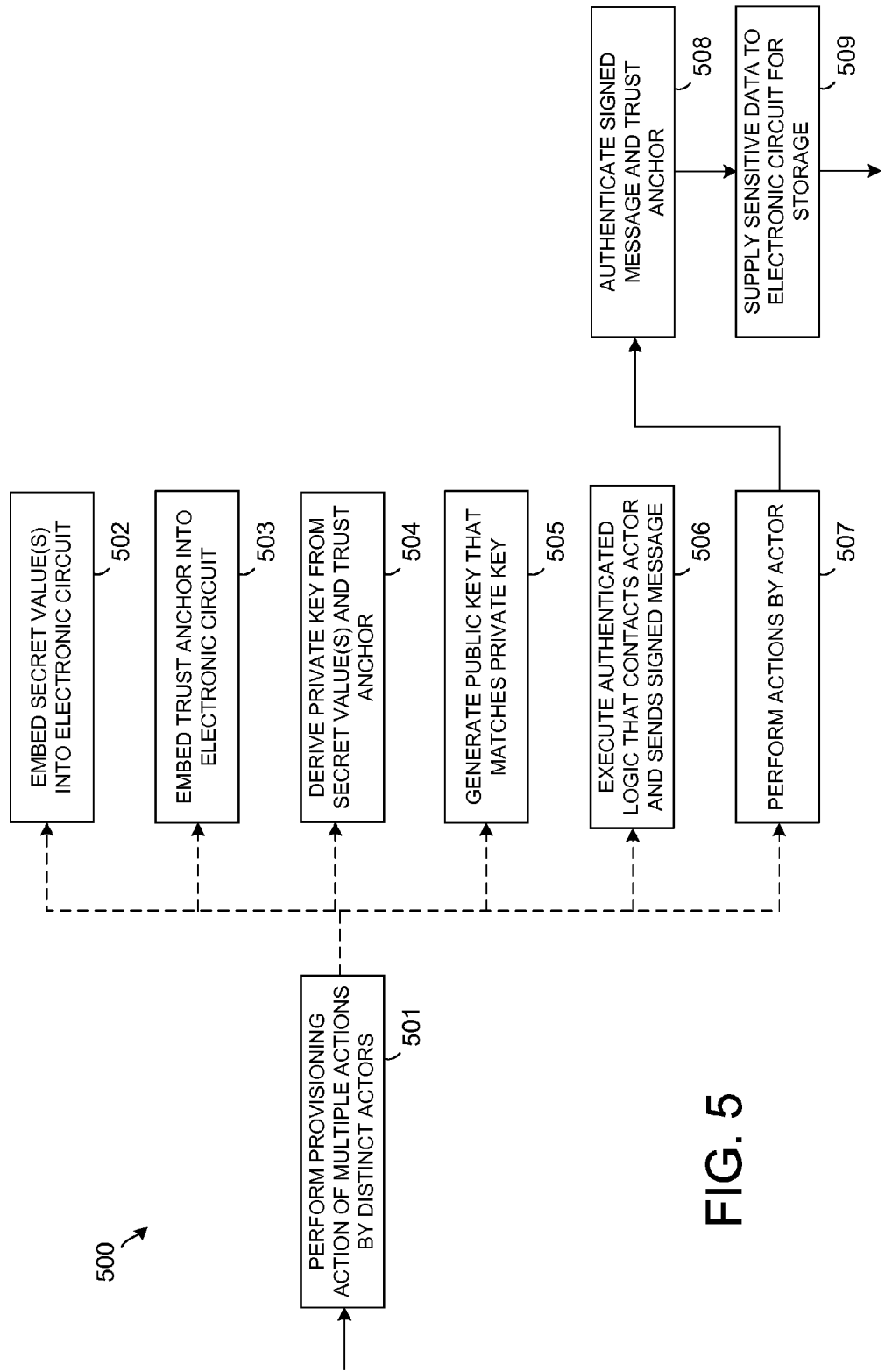
FIG. 5, including FIGS. 5.1, 5.2, 5.3, and 5.4, are schematic flow charts illustrating an embodiment or embodiments of a method of provisioning an electronic circuit that enables security of sensitive data in a design and manufacturing process that includes multiple parties.

FIG. 5, including FIGS. 5.1, 5.2, 5.3, and 5.4, are schematic flow charts illustrating an embodiment or embodiments of a method of provisioning an electronic circuit that enables security of sensitive data in a design and manufacturing process that includes multiple parties. In an illustrative embodiment, a method 500 of provisioning an electronic circuit includes performing 501 at least one provisioning action of a plurality of provisioning actions that are performed by a plurality of distinct actors. The plurality of provisioning actions include embedding 502 at least one secret value into the electronic circuit, embedding 503 a trust anchor into the electronic circuit, deriving 504 a private key from the at least one secret value and the trust anchor, and generating 505 a public key that matches the private key. The plurality of provisioning actions further include executing 506 trust anchor-authenticated logic that contacts a predetermined actor of the plurality of distinct actors and communicates to the predetermined actor a message signed with the private key, and performing 507 actions by the predetermined actor including authenticating 508 the message and the trust anchor, and supplying 509 sensitive data to the electronic circuit for storage. The multiple distinct actors perform various aspects of electronic circuit provisioning. Examples of actors can include an entity that performs circuit design and fabrication or particular aspects of circuit design such as RTL design, ROM design, wafer fabrication, circuit test, and the like. Other actors can be OEMs, manufacturers such as contract manufacturers, and the like.

The private key can be derived from (1) a logic-embedded secret value, (2) a non-volatile storage-embedded secret value specified by the fabrication facility, and (3) the one or more immutable values. The logic-embedded secret value is specified by a fabrication facility and is distinct and common to circuit-model copies of the electronic circuit and unknown and unknowable external to the electronic circuit. The non-volatile storage-embedded secret value is specified by the fabrication facility and is distinct and common to circuit-model copies of the electronic circuit and unknown and unknowable except by the electronic circuit and secure boot firmware.

In a further embodiment, the method 510 of provisioning an electronic circuit further includes generating 511 the one or more secret values for embedding into the electronic circuit. In other embodiments and/or applications, the method 515 of provisioning an electronic circuit further includes programming 516 into the electronic circuit a private key derivation function that derives the private key from the at least one secret value and the trust anchor, and programming 517 into the electronic circuit a public key generation function that generates a public key matching the private key. In some embodiments, the method 520 of provisioning an electronic circuit further includes programming 521 into the electronic circuit a private key signature generation function that generates a signature for signing a message with the private key. The actions of generating secret values and programming various functions into the electronic circuit can typically be performed by a circuit designer and/or fabricator although other actors such as OEMs and manufacturers can perform the operations in some arrangements.

In additional embodiments, the method 525 of provisioning an electronic circuit further includes generating 526 the trust anchor for embedding into the electronic circuit. In some embodiments and/or applications, the method 530 of provisioning an electronic circuit further includes invoking 531 a private key derivation function that is programmed into the electronic circuit and derives a private key from the at least one secret value and the trust anchor and is known only to the electronic circuit, and invoking 532 a public key generation function that is programmed into the electronic circuit and generates a public key matching the private key. In an example provisioning arrangement, the OEM can generate the trust anchor for embedding into the electronic circuit, which can be performed by the OEM or, if suitable, by a design/fabrication facility or by a contract manufacturer. Typically, the OEM can invoke the public key generation function that is programmed into the electronic circuit by the designer/fabricator.

In various embodiments, the method 535 of provisioning an electronic circuit further includes authenticating 536 the trust anchor-authenticated logic against the trust anchor, signing 537 a message with the private key, contacting 538 a server, transmitting 539 the signed message to the server for authenticating the signed message and the trust anchor, receiving 540 sensitive data in response to authentication of the signed message and the trust anchor, and storing 541 the sensitive data in nonvolatile memory. In further embodiments and/or applications, the method 545 of provisioning an electronic circuit further includes receiving 546 at a server a message signed with the private key, authenticating 547 the signed message and the trust anchor, transmitting 548 sensitive data in response to authentication of the signed message and the trust anchor. The actions of authenticating the signed message against the trust anchor and exchanging messages between the integrated circuit and a server can be performed by an OEM, for example using an OEM server, to ensure that data is exchanged only in a certified manner.

In some further embodiments, the method 550 of provisioning an electronic circuit further includes receiving 551 the trust anchor, embedding 552 the received trust anchor into the electronic circuit, invoking 553 execution of the trust anchor-authenticated logic that contacts a server and communicates to the server a message signed with the private key that is known only to the electronic circuit and derived from the at least one secret value and the trust anchor, receiving 554 sensitive data sent by the server in response to authentication by the server of the signed message and the trust anchor, and storing 555 the sensitive data in nonvolatile memory. An actor such as a contract manufacturer can receive the trust anchor from an OEM and, during manufacture of a product that contains an electronic circuit, invoke execution of logic that contacts an OEM server and sends a signed message to the server. The OEM can authenticate the message and, in response, send sensitive data that is stored in the product to ensure that the sensitive data is only installed into the product if authorized.

In a further embodiment, the method 560 of provisioning an electronic circuit further includes invoking 561 the trust anchor-authenticated logic to contact a server, transmitting 562 to the server a message signed with the private key that is known only to the electronic circuit and derived from the at least one secret value and the trust anchor, and supplying 563 server-sensitive data to the electronic circuit. In other embodiments and/or applications, the method 565 of provisioning an electronic circuit further includes signing 566 a message with the private key that is known only to the electronic circuit and derived from the at least one secret value and the trust anchor, sending 567 the signed message to a server, invoking 568 the server to authenticate the signed message and the trust anchor, and to send server-sensitive data to the electronic circuit, and invoking 569 storage of the supplied server-sensitive data to nonvolatile memory. A contract manufacturer can invoke logic that has been authenticated using the trust anchor, for example by an OEM, and contacts an OEM server to enable receipt of OEM-sensitive data and storage of the OEM-sensitive data into a product.

Figure 6:
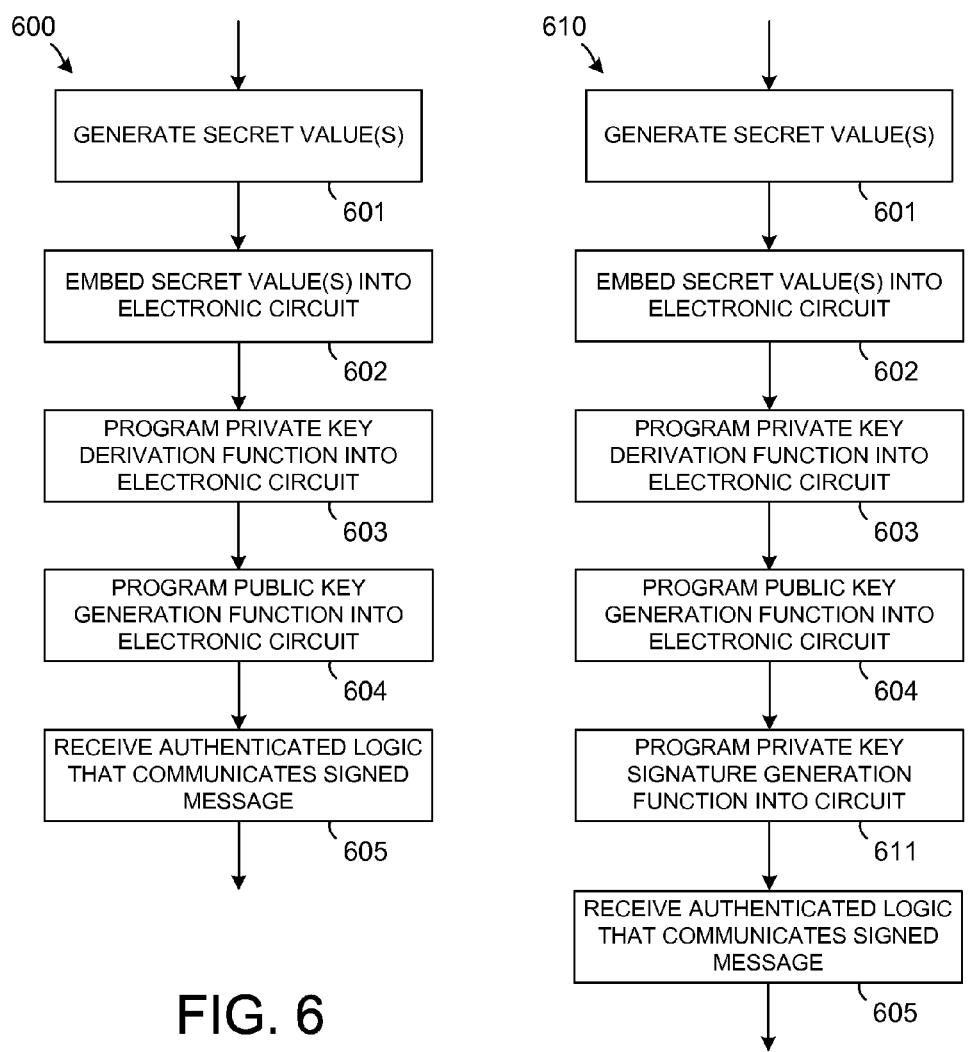
FIG. 6 includes schematic flow charts depicting an embodiment or embodiments of a method of operating a production system that enables security of sensitive data in a design and manufacturing process that includes multiple parties.

FIG. 6 is a schematic flow chart showing an embodiment or embodiments of a method of operating a production system that enables security of sensitive data in a design and manufacturing process that includes multiple parties. The production system actions generally pertain to a circuit design and fabrication facility of the multiple parties. In an illustrative embodiment, a method 600 of operating a production system includes generating 601 at least one secret value, embedding 602 the one or more secret values into the electronic circuit, and programming 603 into the electronic circuit a private key derivation function that derives the private key from the at least one secret value and a trust anchor. The method 600 of operating a production system further includes programming 604 into the electronic circuit a public key generation function that generates a public key matching the private key, and receiving 605 for execution trust anchor-authenticated logic that contacts a predetermined actor of the plurality of distinct actors and communicates to the predetermined actor a message signed with the private key. In a further embodiment, the method 610 of operating a production system can further include programming 611 into the electronic circuit a private key signature generation function that generates a signature for signing a message with the private key. In an example configuration, the provisioning actions of embedding values such as cryptographic information, secret values and the like, and programming logic such as cryptographic functions can be performed by a circuit designer and/or fabricator.

Figure 7:
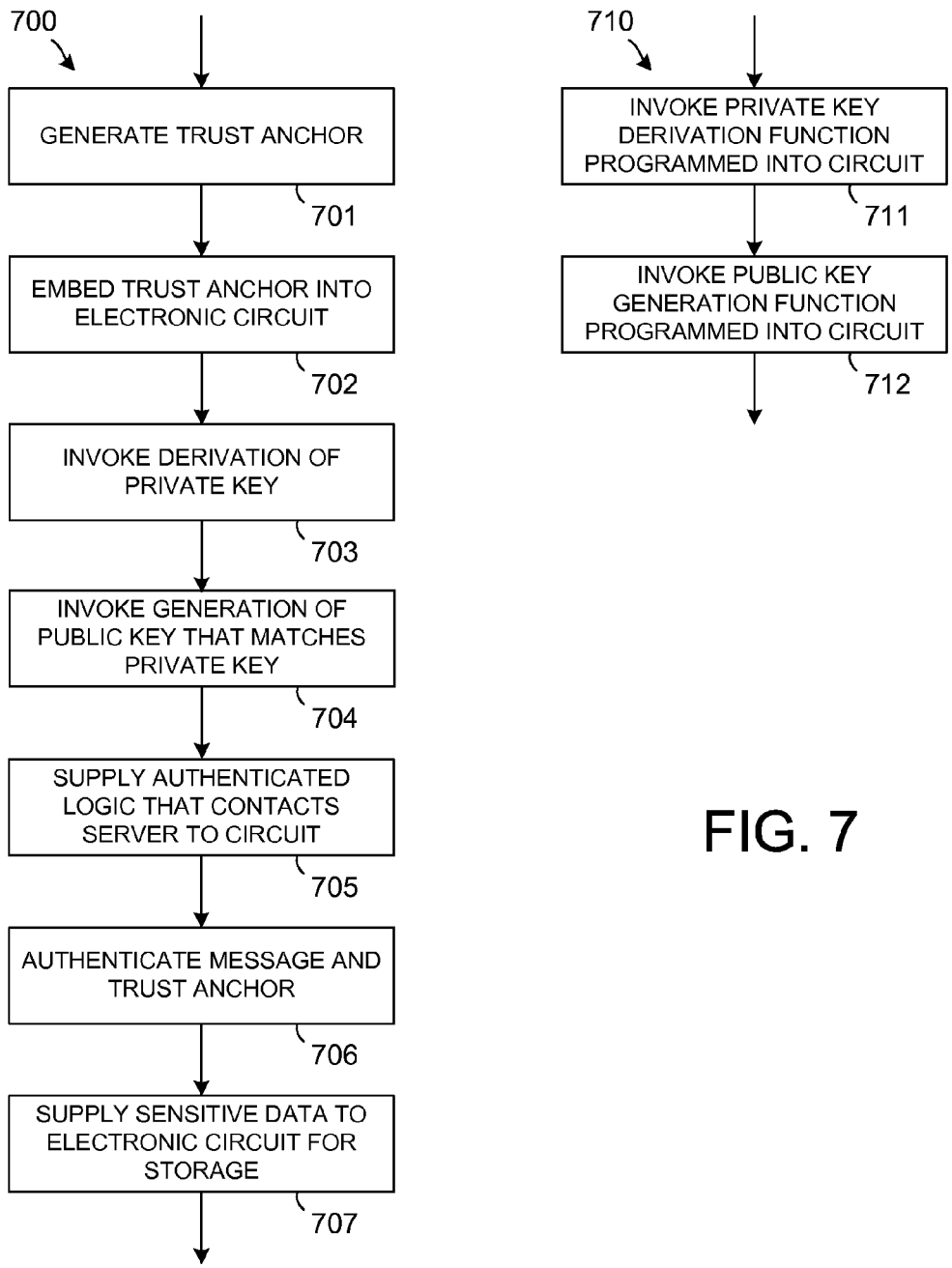
FIG. 7, including FIG. 7.1, depicts schematic flow charts showing an embodiment or embodiments of a method of provisioning an electronic circuit that enables security of sensitive data in a design and manufacturing process that includes multiple parties in which provisioning actions can generally pertain to an OEM facility of the multiple parties.

FIG. 7, including FIG. 7.1, depicts schematic flow charts showing an embodiment or embodiments of a method of provisioning an electronic circuit that enables security of sensitive data in a design and manufacturing process that includes multiple parties. The provisioning actions generally pertain to an OEM facility of the multiple parties. In an illustrative embodiment, a method 700 of provisioning an electronic circuit includes generating 701 a trust anchor, embedding 702 the trust anchor into the electronic circuit, invoking 703 derivation of a private key from at least one secret value embedded into the electronic circuit and the trust anchor, and invoking 704 generation of a public key that matches the private key. The method 700 of provisioning an electronic circuit further includes supplying 705 to the electronic circuit trust anchor-authenticated logic that contacts a server and communicates to the server a message signed with the private key, authenticating 706 the message and the trust anchor, and supplying 707 sensitive data to the electronic circuit for storage.

The trust anchor can be a logic-embedded value that can, in various ways, be maintained as distinct and common to circuit-model copies of the electronic circuit. For example, the OEM can choose that every device having the same part number have exactly the same trust anchor. So when chips are sent to a contracted manufacturer to build instances of a certain device at the request of an OEM and an equivalent block of chips are sent to a different contracted manufacturer to make additional instances of that same device at the request of the same OEM, the trust anchors on all of the chips are the same. The OEM can request that the contracted manufacturer program a known value into fuses in the device which can have one or more secrets originally embedded into the chips, the one or more secrets and the known value programmed by the contracted manufacturer can be combined to form a private key that is distinct to the OEM. The chips are thus customized for each OEM and the value used can be a trust anchor. The OEM signs a code image that the OEM intends to be run on the manufactured device and the OEM requests the manufacturer to place that code image into the manufactured device. The private key for signing the code image is held in secret by the OEM, thus ensuring that only the OEM can sign code images using that private key. The device, at bootstrap loading, first executes the internal ROM code which verifies that the signed code image is correct by checking the digital signature on the code image. The public key for verifying the code image can be burned into fuses on the device as the trust anchor. If the signature over the code image does not verify correctly using the trust anchor that was programmed by the contracted manufacturer, the internal ROM code will not allow the code image to be executed. So once the correct trust anchor is blown into fuses on the device, the device will only run code that has been properly signed by the OEM. The trust anchor that is burned into the fuses is a public value that is available to anyone, but is integrity-protected so that modification of the value is not permitted. Once the trust anchor is entered, the fuses are locked for writing and burning of additional bits into that block of fuses is not possible. Thus an OEM-unique public value is blown into the fuses by a contract manufacturer, and the OEM-unique public value can be used along with the secret to generate a different private key. Public key cryptography can use a private key for signing and a public key that is usable by the public to verify the signature. The code-signing public key as the trust anchor is entered into every chip that runs the OEM's signed code image and enables verification that the code image is correct. The signed code image is signed at one place, the OEM trusted preproduction facility, and can be verified on any chip.

The OEM ensures that the contracted manufacturer has blown the correct trust anchor by forcing the manufactured device to contact the OEM's server to obtain crucial secret information. The crucial secret information is chosen such that a significant feature of the manufactured device will be inoperable without knowledge of this crucial secret information. This crucial secret information could be cryptographic keys needed to communicate with other products, or could be crucial parts of the software, or the like. The OEM's server will supply the needed crucial secret information to the manufactured device only if a properly signed message is received from the manufactured device. The OEM server verifies the signature over the message received from the manufactured device using the public key that matches the private key derived on the manufactured device. Since the electronic circuit within the manufactured device derives the private key, in part, from the trust anchor that was burned into fuses by the contracted manufacturer, the private key, and hence the signature over the signed message, will be correct only if the contracted manufacturer burned the correct trust anchor into fuses. Since the trust anchor was used both in verifying the booted code image and in deriving the private message signing key, if the signature over the signed message verifies correctly the OEM server can be assured that the manufactured device is running a boot image that was signed by the OEM. Knowing that the manufactured device is running OEM software, the OEM can be assured that supplying the crucial secret information to the manufactured device is safe and appropriate because the running software will properly safeguard that crucial secret information.

In other embodiments and/or applications, the method 710 of provisioning an electronic circuit can further include invoking 711 a private key derivation function that is programmed into the electronic circuit and derives a message-signing private key from the at least one secret value and the trust anchor and is known only to the electronic circuit, and invoking 712 a public key generation function that is programmed into the electronic circuit and generates a message-signing public key matching the message-signing private key. In some embodiments, the method 715 of provisioning an electronic circuit can further include receiving 716 a message that is signed with the private key from the electronic circuit, authenticating 717 the trust anchor-authenticated logic against the trust anchor, and transmitting 718 sensitive data available in response to authentication of the signed message and the trust anchor to the electronic circuit for storage in nonvolatile memory. In additional embodiments, the method 725 of provisioning an electronic circuit further includes receiving 726 at the server a message signed with the private key, authenticating 727 the signed message and the trust anchor, and transmitting 728 sensitive data in response to authentication of the signed message and the trust anchor.

The trust anchor identifies to the OEM that the electronic circuit is properly configured for the OEM and therefore runs the OEM software. The trust anchor is mixed into the generation of the private key that is used for authentication. The trust anchor, as mixed into the private key, is bound into the message implicitly. The secret value that is put into the chip and the private key are two different values. The secret is mixed with the trust anchor to generate the private key. In other embodiments and/or applications, the trust anchor does not have to be mixed into the private key but can be a mandatory component of the message that is signed and so is bound to the message explicitly with similar effect to implicit binding. Thus the secret in the chip is the private key, is programmed directly into the chip, and no mixing occurs. In this alternative, the secret in the chip, rather than being mixed via a key derivation function to generate the private key, can be used directly as the private key. Then, every time a message is signed, a unique identifier and the trust anchor can be appended, ensuring that the trust anchor is included as part of the signature for the message. In summary, the trust anchor can be mixed into the private key, or can be mixed into the generation of the signature, or both. In either case, the trust anchor is included to cause the signature to be different on parts for different OEMs.

For the OEM's protection, an OEM-specific private key can be entered into every chip, enabling the OEM to authenticate the chip because a secret used to derive the private key is entered only into the proper chips. The secret value is placed into the chip either in logic, fuses, or ROM code. The secret value is unknown to any party and is combined with the trust anchor placed by a contract manufacturer for the OEM onto the chip as the public value that is integrity-protected. Both of the secret value in logic or fuses and the trust anchor in the fuses are integrity-protected and are incapable of modification by any party. The public can read the trust anchor, but no party can read the secret value. The secret value and trust anchor are combined in a function called a key derivation function to generate a private key that is unique to the chip running with the trust anchor. When the private key is generated, the corresponding message-signing public key is also generated and can be stored off the chip. The private key can be stored in a register inside the chip and is locked to prevent reading other than by the cryptographic module. When the chip bootstrap loads, the private key generated from the secret and the trust anchor becomes available internally, and the message-signing public key is made available to the world. The OEM has access to the public value and can request the manufacturer to load the proper trust anchor into every chip that is made for the OEM's product. If the manufacturer follows the instructions of the OEM and blows the proper trust anchor into the fuses, each chip at each bootstrap load will produce the same private key repeatedly at every bootstrap load operation. The public key is known to the world because, once generated, the public key does not change because the private key does not change. The chip running proper provisioning software from the OEM can contact the OEM over a network. The OEM can give a message to the chip. The chip then signs the message using the chip's private key which is unknown by any party, even the OEM. The private key is internally generated and unknown to anyone. All that is known is that the public key corresponding to the private key is held by the OEM. After the chip has signed the message with the private key, the chip sends the signed message to the OEM. The OEM can then verify the message with the known message-signing public key. If the message verifies and is thus authenticated, then the OEM verifies several conditions including: (1) the chip is authorized and is from the correct circuit designer/fabricator, (2) the manufacturer has blown the proper trust anchor into the chip so that the chip can now run code provided by the OEM, (3) the OEM has generated the proper signature for the system code image that is running, and has booted securely, and (4) the chip can generate a Virtual Private Network (VPN) tunnel-secure communication link with the OEM and the OEM can download sensitive data into the product containing the chip.

If the manufacturer attempts to cheat and place a different trust anchor into the chip, most likely the manufacturer's own trust anchor, meaning that the manufacturer would have the private key to sign code and cause the product to run the manufacturer's code rather than the OEM's code, the private key generated and held in the register internal to the chip would be an incorrect private key. Thus, when the chip communicates with the OEM and signs a message for the OEM, the signature would be incorrect and the OEM would find that the manufacturer put the wrong trust anchor into the chip. The OEM thus has information to avoid injecting additional sensitive data into the chip. The OEM can verify, essentially trust and verify, trusting the manufacturer to comply with contractual specifications about embedding the trust anchor in the chip to enable verification. Once the proper trust anchor is in the chip, the OEM is assured that the chip will only run code supplied by the OEM. Thus, when the product communicates with the OEM, the OEM is assured that the code is proper and authorized. When the OEM downloads sensitive data onto the chip, software of the OEM is assured to use and protect the sensitive data properly, preventing the manufacturer from improperly using manufacturer's code to download and reveal the sensitive data or to bypass security of the sensitive data. Accordingly, embodiments of the disclosed system, components, and techniques ensure that the trust anchor, as a public value, is correctly embedded in the product, allowing the OEM to inject the OEM secret into the chip in which, without the OEM secret, the product cannot run correctly. The manufacturer is prevented from creating additional clones of the product that do not contain the secret.

Figure 8:
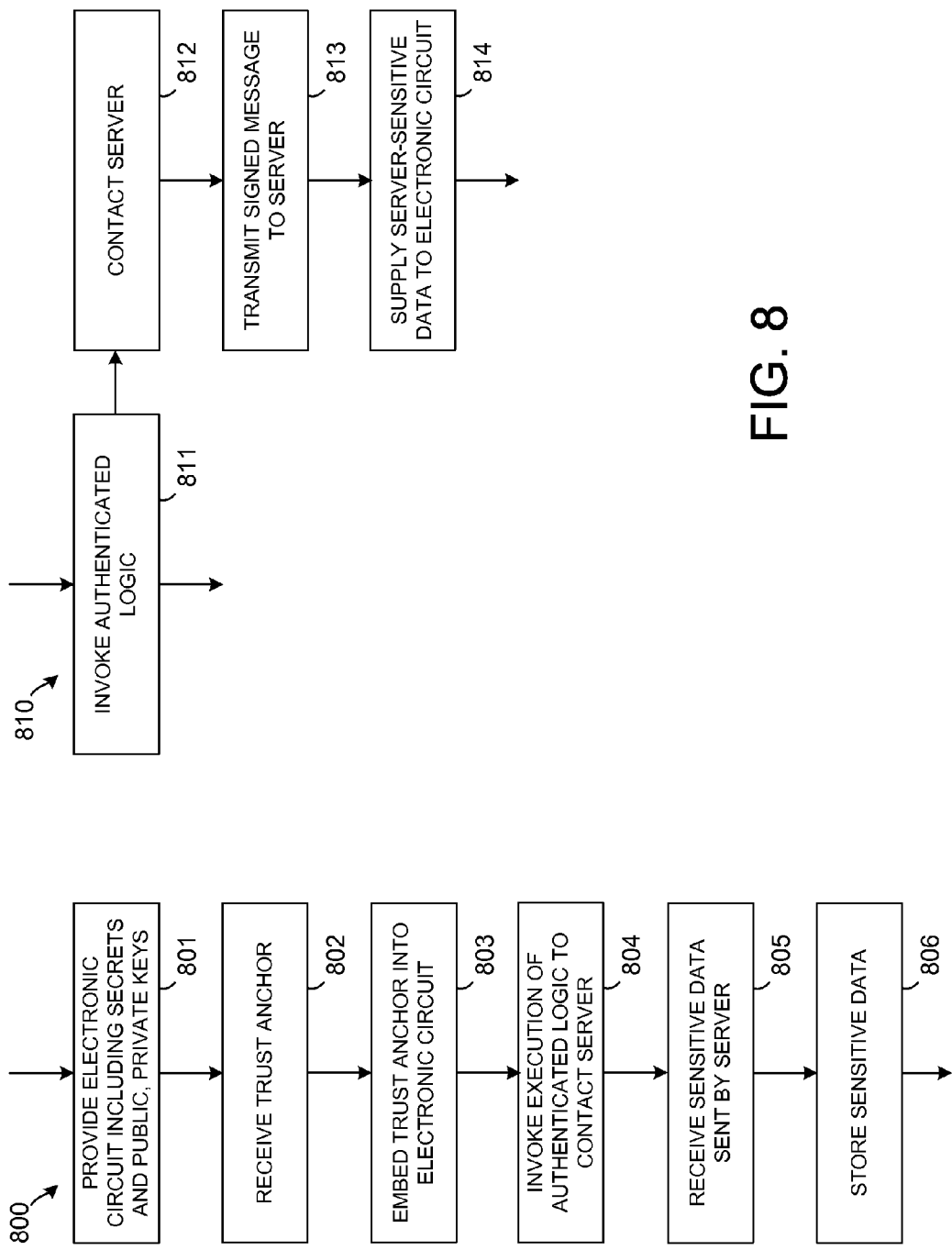
FIG. 8, including FIG. 8.1, illustrates schematic flow charts showing an embodiment or embodiments of a method of provisioning an electronic circuit that enables security of sensitive data in a design and manufacturing process that includes multiple parties in which provisioning actions generally pertain to a contract manufacturer facility of the multiple parties.

FIG. 8, including FIG. 8.1, illustrates schematic flow charts showing an embodiment or embodiments of a method of provisioning an electronic circuit that enables security of sensitive data in a design and manufacturing process that includes multiple parties. The provisioning actions generally pertain to a contract manufacturer facility of the multiple parties. In an illustrative embodiment, a method 800 of provisioning an electronic circuit includes providing 801 the electronic circuit including at least one embedded secret value, a private key derived from the at least one secret value and a trust anchor, and a public key that matches the private key. The method of provisioning 800 the electronic circuit further includes receiving 802 the trust anchor, embedding 803 the received trust anchor into the electronic circuit, and invoking 804 execution of the trust anchor-authenticated logic that contacts a server and communicates to the server a message signed with the private key that is known only to the electronic circuit and derived from the at least one secret value and the trust anchor. The method of provisioning 800 the electronic circuit further includes receiving 805 sensitive data sent by the server in response to authentication by the server of the signed message and the trust anchor, and storing 806 the sensitive data in nonvolatile memory.

In some embodiments and/or applications, the method 810 of provisioning an electronic circuit further includes invoking 811 the trust anchor-authenticated logic to contact 812 a server, transmit 813 to the server a message signed with the private key that is known only to the electronic circuit and derived from the at least one secret value and the trust anchor, and supply 814 server-sensitive data to the electronic circuit. In various embodiments, the method 820 of provisioning an electronic circuit further includes signing 821 a message with the private key that is known only to the electronic circuit and derived from the at least one secret value and the trust anchor, sending 822 the signed message to a server, and invoking 823 the server to authenticate 824 the signed message and the trust anchor, and to send 825 server-sensitive data to the electronic circuit. The method 820 of provisioning an electronic circuit further includes invoking 826 storage of the supplied server-sensitive data to nonvolatile memory.

Embodiments of the illustrative system address interactions between multiple parties. In an example arrangement, four parties can be involved including an electronic chip designer and/or fabricator, an OEM that makes available a product that includes electronic chips from the electronic chip designer and/or fabricator, a manufacturer under contract to the OEM, and an end user or final customer. The contract manufacturer typically receives the chip from the fabricator directly, not through the OEM. Otherwise, if the OEM can handle the chip, other techniques can be used to enable verifying the contract manufacturer. The illustrative arrangement assists the OEM and manufacturer. The OEM may not trust the manufacturer because the manufacturer may reverse engineer the design and build a product without authorization. The manufacturer may sell sensitive data of the product to a third party. The manufacturer may be contracted to build a specified number of devices for the OEM but in reality may make a larger number while sending the specified number of devices back to the OEM, selling extra devices on the black market or gray market. The OEM does not necessarily have the greatest level of trust of the manufacturer so the OEM may desire to ensure that the manufacturer abides by the contract. The OEM desires to be able to verify actions of the manufacturer.

Embodiments of the disclosed system, components, and techniques enable the OEM to inject some type of sensitive data into the end product that the manufacturer builds without the manufacturer being able to determine or modify the sensitive data. In various embodiments, the sensitive data can be a secret key, an encrypted code image, a device driver that has to operate exactly as specified or otherwise the product does not work. In other embodiments, the sensitive data may be a token to enable specific high-value features of the product. A suitable secret is sufficient if capable of preventing the manufacturer from making an unauthorized copy. Each time the OEM injects the sensitive data into a product, the system and technique can enable an audit that determines whether the manufacturer is in compliance with the contract and, if the manufacturer has overproduced a product, the violation can be detected. The illustrative system and techniques thus enable the OEM to verify that the manufacturer is in compliance with certain aspects of the contract.

One method for usage by an OEM in injecting a sensitive data onto a chip is programming of a fuse box, a block of fuses within which a fabricator can blow a secret key or known value. For example, the fuses can be programmed with a trust anchor. In other arrangements, the electronic circuit can include a bank of hash values that are programmable by the OEM. The OEM can enter a desired value onto the chip.

If the OEM buys the chip from a chip designer/fabricator, the OEM can request programming of a secret into the fuses before the chip is shipped to the manufacturer. The fabricator secret is in every chip for all OEMs. The trust anchor differentiates between different OEMs. The fabricator sends chips directly to the manufacturer, who embeds the trust anchor. When the set of chips are received by the manufacturer, the manufacturer can enter the trust anchor into the product and the product will only run if the trust anchor is correctly programmed. Embodiments of the disclosed system and technique thus ensure that the manufacturer does not build too many devices.

Embodiments of the design process can enable different parties to inject secrets and public values at different points. For example, some arrangements can enable the OEM to not touch the integrated circuit chip from a fabricator/designer and thus to not embed a secret. Otherwise, the OEM can embed a secret before sending the chip to a contract manufacturer. The techniques disclosed herein enable the OEM to exploit a secret embedded by the fabricator/designer without receiving the chip. In other arrangements, a chip designer/fabricator can send chips to the OEM, the OEM can burn the secret into the chip without knowledge of the chip designer/fabricator, and the OEM can send the chips to further parties in the process. In another arrangement, the OEM can request the chip designer/fabricator to enter the secret pattern onto chips and to send the chips to the manufacturer.

Figure 9:
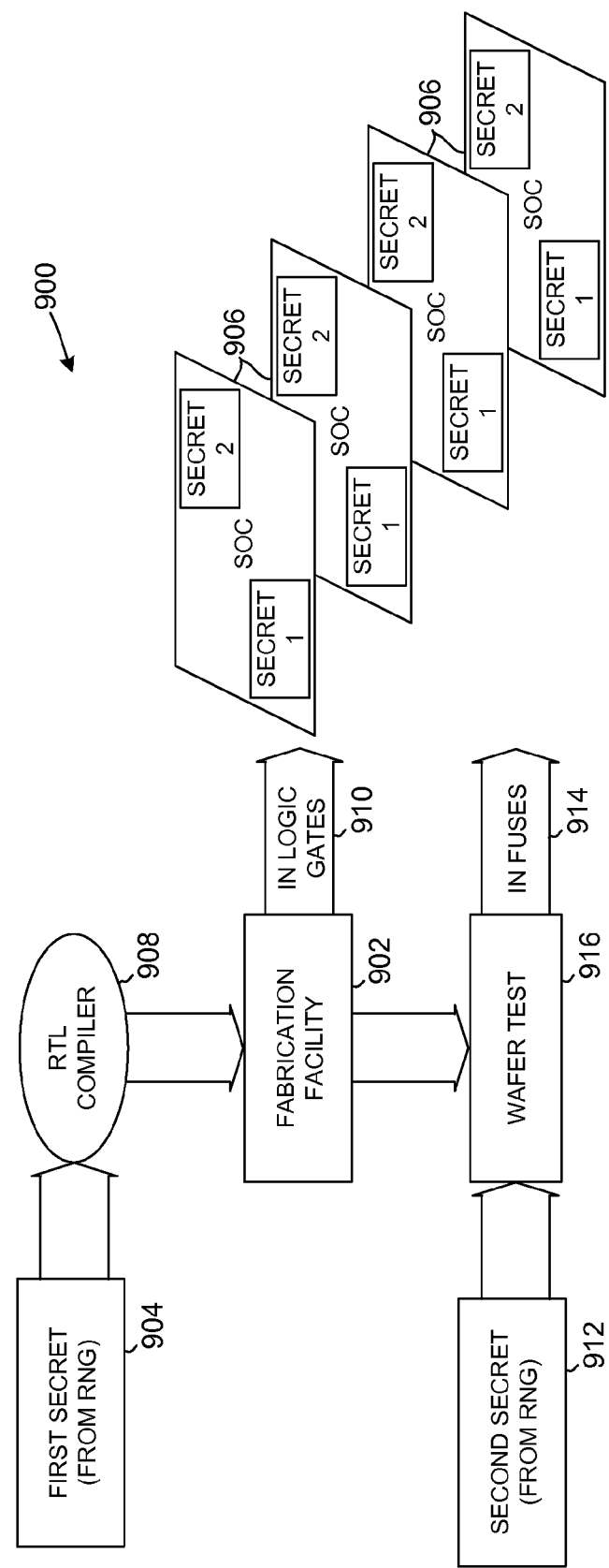
FIG. 9 is a schematic block diagram illustrating components of the design and manufacturing process at the stage of design and production of the SOC.
Figure 10:
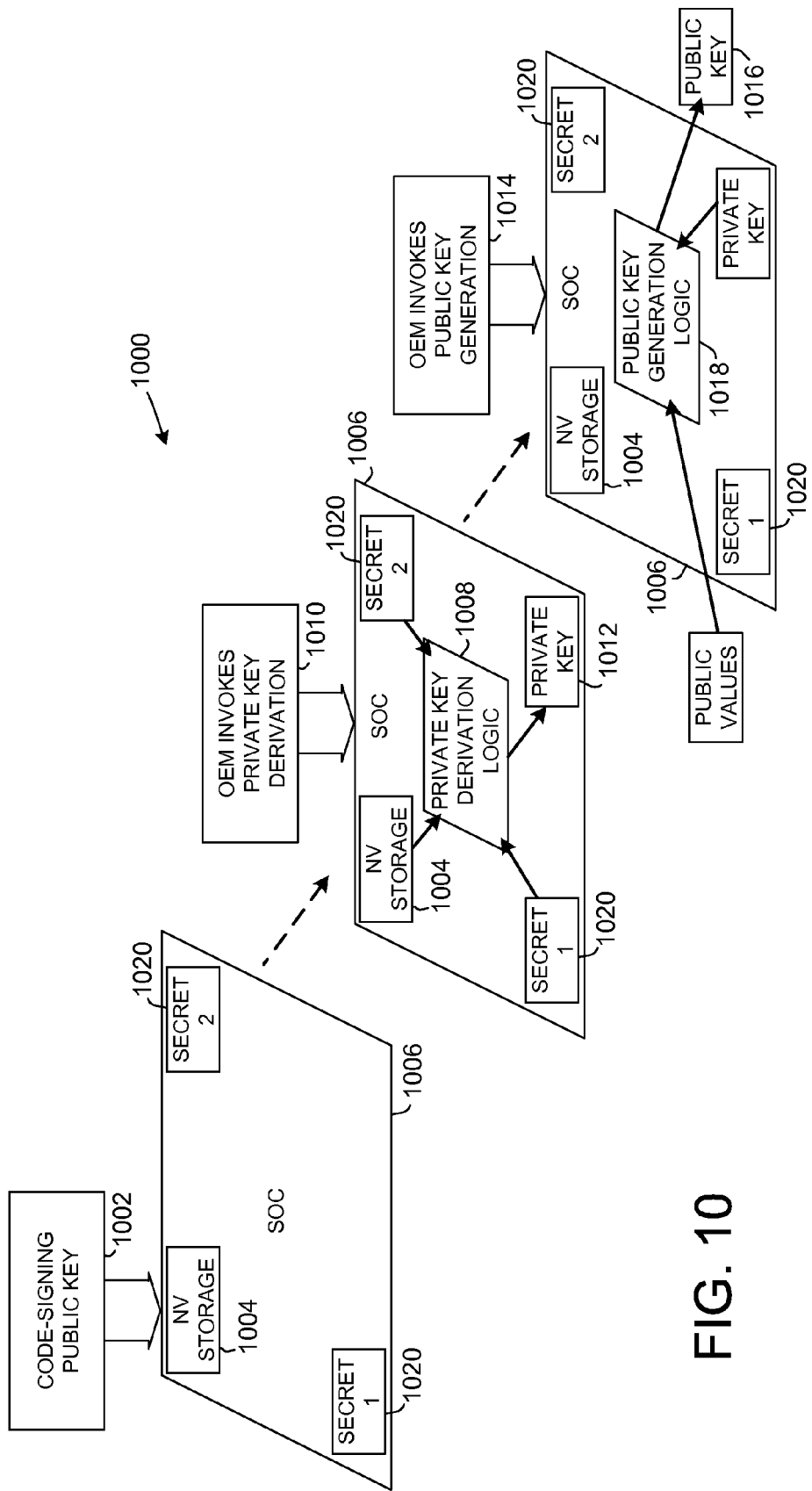
FIG. 10 is a schematic block diagram showing components of the design and manufacturing process at the stage performed at an OEM's facility.
Figure 11:
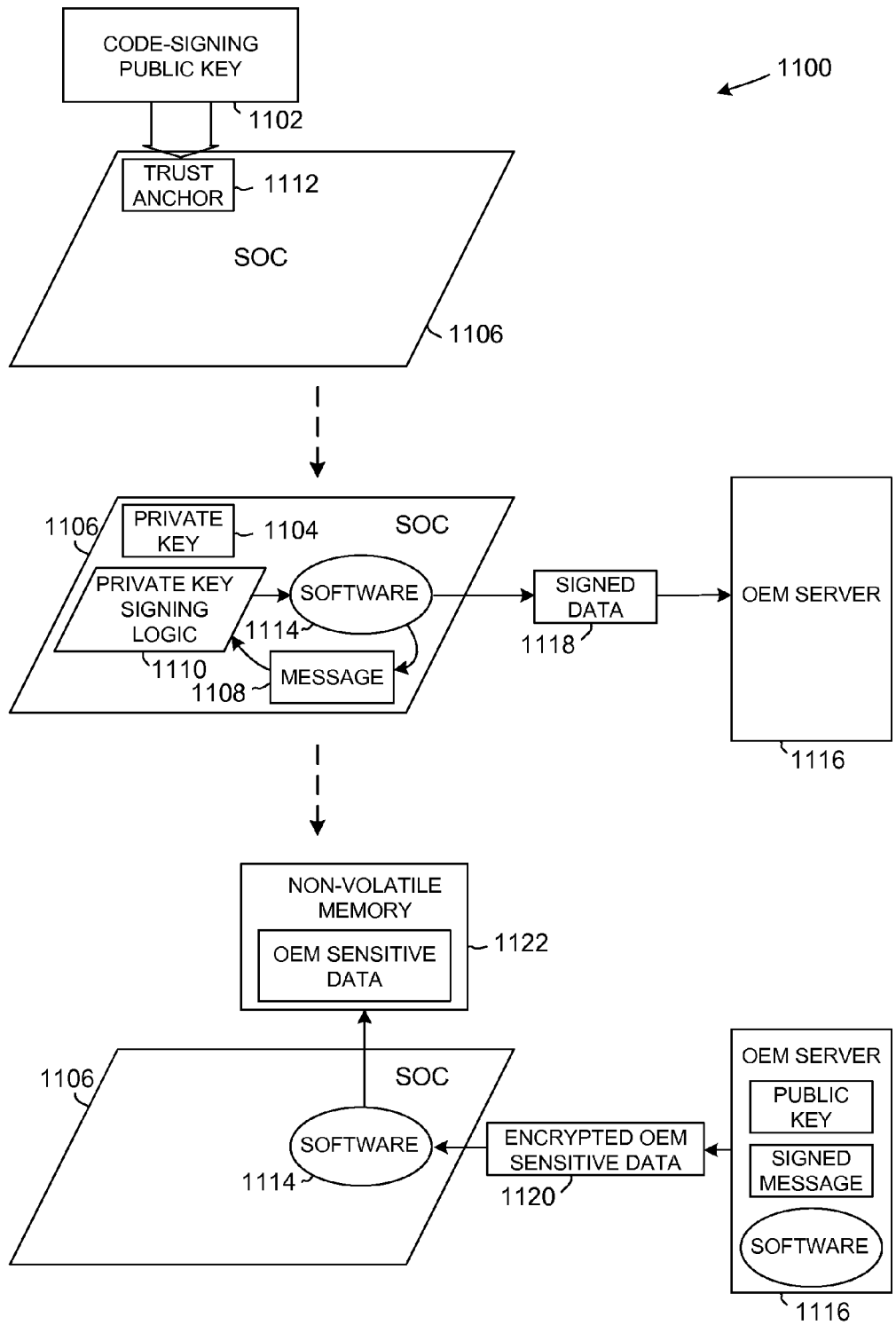
FIG. 11 is a schematic block diagram depicting components of the design and manufacturing process at the stage performed at a contract manufacturer's facility to customize each chip to the OEM's specifications.

Embodiments of a design and manufacturing process for electronic products that includes multiple parties enables security of sensitive data in a possibly untrusted environment. Components of the system and electronic circuits can include (1) a private key embedded within a System on a Chip (SOC), (2) elements within the SOC capable of generating a public key to match the private key, and (3) elements for signing certain messages with the private key. The private key is derived from several components at least one of which is known only to the hardware, and at least one of which resides in non-volatile storage on the SOC. FIGS. 9, 10, and 11 illustrate how components interact at various stages in the design and manufacturing process to accomplish the goal of securing provisioning devices within an untrusted environment.

Referring to FIG. 9, a schematic block diagram illustrates components of the design and manufacturing process at the stage 900 of design and production of the SOC. At the SOC design and fabrication facility 902, a common secret value 904 is built into the hardware of every copy 906 of an SOC. The secret value 904 can be applied at the fabrication facility 902 via an RTL compiler 908. The secret value 904 is applied to logic gates 910 of the SOC copies 906 and is to be completely unknown and unknowable outside the hardware. At the SOC design and fabrication facility 902, another secret value 912 is burnt into fuses 914 within every copy 906 of an SOC, for example at wafer test 916. The secret value 912 is preferred to be completely unknown and unknowable except by hardware and secure boot firmware.

Referring to FIG. 10, a schematic block diagram illustrates components of the design and manufacturing process at the stage 1000 performed at an OEM's facility. The OEM performs several steps on a chip to customize the message-signing private authentication key and obtain a matching message-signing public key. At the OEM facility, one or more immutable values such as a code-signing public key 1002 are placed in non-volatile storage 1004 within one or more copies 1006 of that same SOC. The OEM customizes the private key by adding the public code-signing public key 1002 stored in non-volatile memory as a trust anchor 1004 on the chip 1006. The OEM invokes 1010 private key derivation logic 1008 on the SOCs 1006 that derive the private key 1012 from the one or more secret values in hardware 1020 and the values in non-volatile storage 1004, and invokes the public key generation logic 1014 to generate the matching message-signing public key 1016. Accordingly, the OEM invokes 1010 the private key derivation function 1008 that is built into the chip 1006. The OEM also invokes 1014 the public key generation function 1018 built into the chip 1006 to obtain the matching public key 1016. The public key 1016 is exported from the SOC 1006 and is retained by the OEM.

In some embodiments, the OEM may be unable or may desire not to perform the disclosed operations and arrange for the device designer/fabricator to perform the operations of both FIGS. 9 and 10 and send the devices to the manufacturer, either directly or through a distributor. The situation is common for OEMs without the capability of blowing fuses, for example. A common and simple arrangement is for the manufacturer not to obtain parts from the OEM or the circuit designer/fabricator, but rather from a distribution channel in which case every chip is identical to every other chip and neither the circuit designer/fabricator nor the OEM can burn the trust anchor into the fuses.

Thus the manufacturer can be permitted to blow the trust anchor pattern into the fuses, but with the consequence that the manufacturer can change the pattern that is blown into the fuses or can blow the same trust anchor pattern into extra chips. Embodiments of the disclosed system and techniques prevent the manufacturer from changing the trust anchor or provisioning additional devices. The manufacturer is thus forced to blow the correct trust anchor, a non-secret pattern, into the fuses of the devices such that the device will only work if the proper trust anchor is blown into the fuses. Only a chip that has the proper trust anchor can attain the sensitive data that the OEM wants injected into the product. The contract manufacturer may be able to blow an alternative trust anchor and have the associated logic functioning, but then the SOC will not be able to identify or authenticate to the server to attain the OEM's sensitive data. The manufacturer is denied full control over every device and cannot violate the contract, enabling the circuit designer/fabricator to sell the chip through a distribution channel and yet prevent the manufacturer from violating the contract with the OEM.

Referring to FIG. 11, a schematic block diagram illustrates components of the design and manufacturing process at the stage 1100 performed at a contract manufacturer's facility to customize each chip to the OEM's specifications. At the contract manufacturing facility 1100, the manufacturer customizes each SOC chip 1106 by burning the OEM's code-signing public key 1102 into fuses as a trust anchor 1112. Logic 1110 is invoked that derives a message-signing private key 1104. The private key 1104 is used to sign message data 1108 with the trust anchor 1112 and possibly a chip-unique identifier such as a serial number. The chip 1106 executes OEM-supplied software 1114 that is authenticated against the trust anchor 1112. The OEM-supplied software 1114 contacts the OEM's server 1116 and delivers a message, possibly along with the trust anchor and chip-unique identifier, signed with the private key 1104. The signed data 1118 is sent to the OEM which authenticates the signature using the public key and verifies the signed data. The server 1116 authenticates the message and trust anchor and supplies the OEM sensitive data to the chip 1106, which can store the encrypted sensitive data 1120 in non-volatile memory 1122.

OEMs desire assistance in the use of contract manufacturers that the OEM does not trust. The OEMs are fearful of over production by the manufacturer, or the manufacturer releasing design secrets to third parties. The illustrative system and components enable an OEM to use an untrusted contract manufacturer, for example an untrusted overseas contract manufacturer, enabling a reduction in cost in comparison to use of a trusted contract manufacturer. When using an untrusted contract manufacturer, the OEM is exposed to the risk that the contract manufacturer may produce "overruns" of the OEM's devices by buying additional chips. The OEM also is exposed to the risk that the contract manufacturer will run unauthorized software that contacts the OEM's server and obtains and mishandles the OEM's sensitive data. Some embodiments of the illustrative system and technique can use a split private key for protecting secret information within the private key in addition to customization of the private key by inclusion of the trust anchor. Embodiments of the disclosed system and technique embed a private key split into silicon and combine the embedded private key with one or more other splits stored in non-volatile storage on the chip. By changing the split(s) in non-volatile storage, the private key can be customized for each customer, and can be changed when desired. The corresponding message-signing public key is used to authenticate the chip and sensitive customer data during chip customization at an untrusted manufacturing facility.

The secrets can be entered to the electronic circuit into multiple, for example three, different pieces to make reverse engineering more difficult. The multiple secrets in combination form a single secret that is in the electronic circuit. The secret is entered onto the circuit to perform the protocol. Splitting the secret protects the secret. Combining the secrets of the device designer/fabricator and the trust anchor of the OEM facilitates the protocol. The OEM code-signing public key is embedded as the trust anchor in an embedding action performed by the manufacturer on behalf of the OEM. The OEM code-signing public key can be embedded directly as the trust anchor by the manufacturer, or a shorter hash of the code-signing public key may be embedded as the trust anchor.

In various embodiments, the secrets can be burned into a block of fuses that can be locked and are not readable. In other implementations, the secrets can be embedded into ROM code, in a block of ROM that can be read only at boot time and locked into a region of ROM code that can no longer be read. In further arrangements, the secrets can be secured as part of the packaging method in which a secret component can be maintained in a second chip in the same package. The secret can be entered any place on the chip with no limitation on how the secret is split as long as the full secret comes together within the package that travels through various distribution channels to the contract manufacturer. In further embodiments, the secret and secret components can be stored in a battery-backed set of registers with a battery in the chip maintaining the flip-flops running even when the chip is powered off, acting as a set of fuses that can be programmed and maintained.

Figure 12:
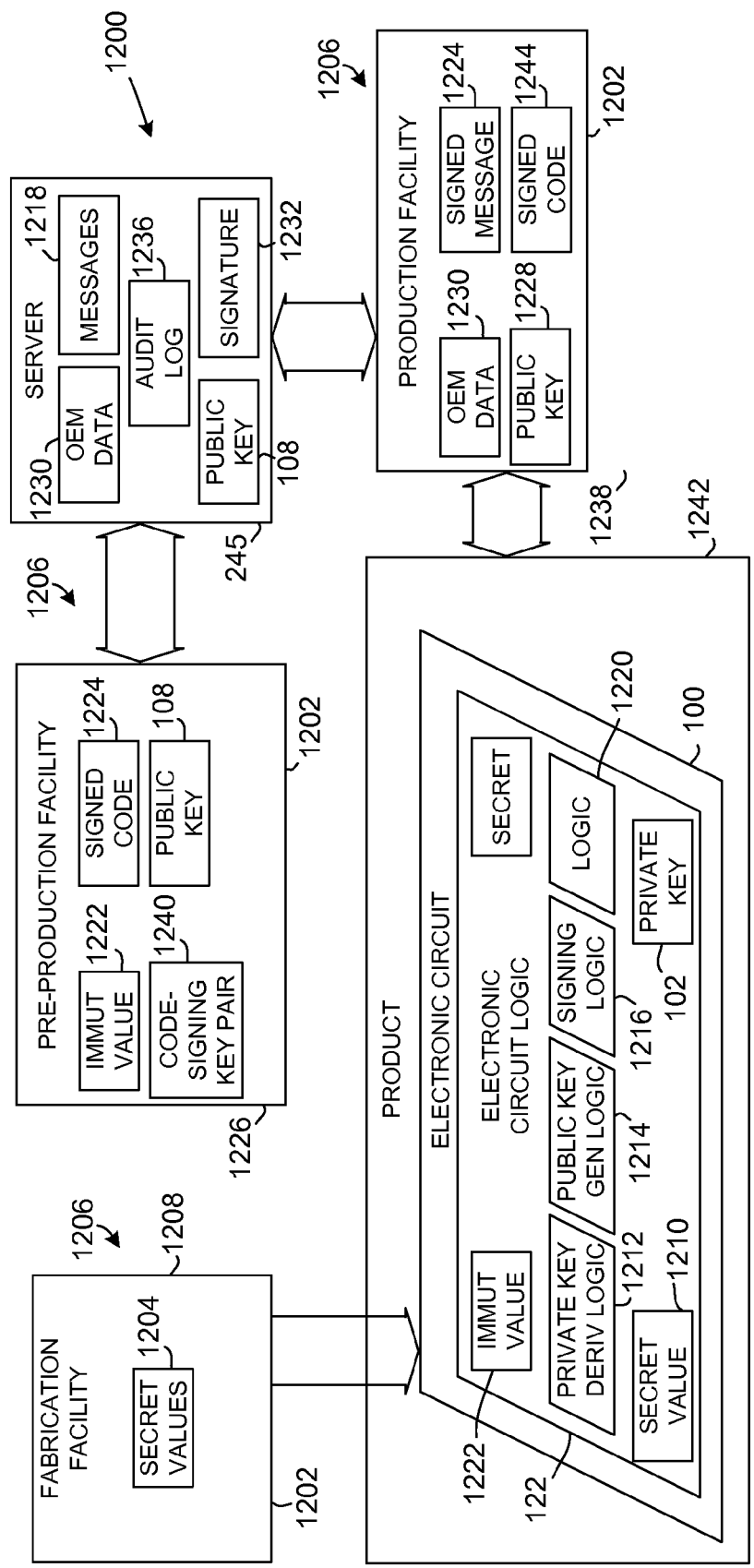
FIG. 12 is a schematic block diagram illustrating an embodiment of a production system that facilitates secure provisioning of circuits, systems, and devices in a potentially untrusted environment.

Referring to FIG. 12, a schematic block diagram depicts an embodiment of a production system 1200 that facilitates secure provisioning of circuits, systems, and devices in a potentially untrusted environment. An embodiment of a production system 1200 can include a facility 1202 or 1208 that generates one or more secret values of a plurality of secret values 1204 that are generated by a plurality of distinct actors 1206 enters the at least one secret value of the plurality of secret values 1204 into electronic circuit logic 122 at different stages of production of an electronic circuit 100. The plurality of secret values 1204 include at least one secret value known only to the electronic circuit 100 and at least one immutable value 1222 cryptographically bound into messages and residing on the electronic circuit 100.

In various embodiments, the production system 1200 can further include a fabrication facility 1208 that designs at least one secret value 1204 into the electronic circuit 100 such that instances of the electronic circuit 100 hold an identical secret value 1210. The fabrication facility 1208 fabricates the electronic circuit 100 incorporating logic 1212 that derives a private key 202 from the identical secret value 1210, logic 1214 that generates a public key 108 that matches the private key 202, and logic 1216 that signs messages 1218 with the private key 202. In particular embodiments, the fabrication facility 1208 can be configured to fabricate the electronic circuit 100 to further include logic 1220 that incorporates an immutable value 1222 into the signed message 1224 such that the immutable value 1222 is selected from a group including a code-signing public key, a hash of the code-signing public key, a chip-unique identifier such as a serial number, and the like.

In other embodiments, the production system 1200 can further include a trusted pre-production facility 1226 that generates a code-signing public key 1228, signs code using the private key from the code-signing public key 1228, uses the electronic circuit 100 to create a message-signing key pair, including private key 202 and a matching public key 108 based on the at least one secret value, retains the public key 108, and operates a server 245. Aspects of operating the server 245 can include holding OEM sensitive data 1230, verifying a signature 1232 over messages 1218 using the public key 108, and sending OEM sensitive data 1230 to a production facility 1238. In more particular example embodiments, the production system 1200 can further include the trusted pre-production facility 1226 that further embeds an immutable value 1222 into at least one instance of the electronic circuit 100, causing the electronic circuit 100 to generate a message-signing key pair, including private key 202 and the corresponding public key 108. The trusted pre-production facility 1226 also can generate the public key 108, and retain the public key 108. In various embodiments, the production system 1200 can be configured such that the trusted pre-production facility 1226 further maintains an audit log 1236 that records messages 1218. In further embodiments, the production system 1200 can be configured such that the trusted pre-production facility 1226 further maintains an audit log 1236 that records unique identifiers from messages 1218. In some applications and/or embodiments, the production system 1200 can be configured such that the trusted pre-production facility 1226 further causes the electronic circuit 100 to authenticate the pre-production facility 1226.

In some embodiments and/or applications, the production system 1200 can further include an untrusted production facility 1238 that embeds a public key from a code-signing key pair 1240 into individual instances of a fabricated electronic circuit 100 as the immutable value 1222 such as a trust anchor, embeds a code signed by a private key from the code-signing key pair 1240 into individual instances of a product 1242 incorporating the fabricated electronic circuit 100, and executes the signed code 1244. Execution of the signed code 1244 causes the electronic circuit 100 to sign messages 1218 using the private key 202 generated within the electronic circuit 100, and send the signed message 1224 to the server 245. In a further embodiment, the production system 1200 can be configured such that the untrusted production facility 1238 further receives OEM sensitive data 1230 from the server 245. In particular example embodiments, the production system 1200 can be configured such that the untrusted production facility 1238 further causes instances of the fabricated electronic circuit 100 to sign a message 1218 that includes a chip-unique identifier for the individual instances of the fabricated electronic circuit 100.

Figure 13:
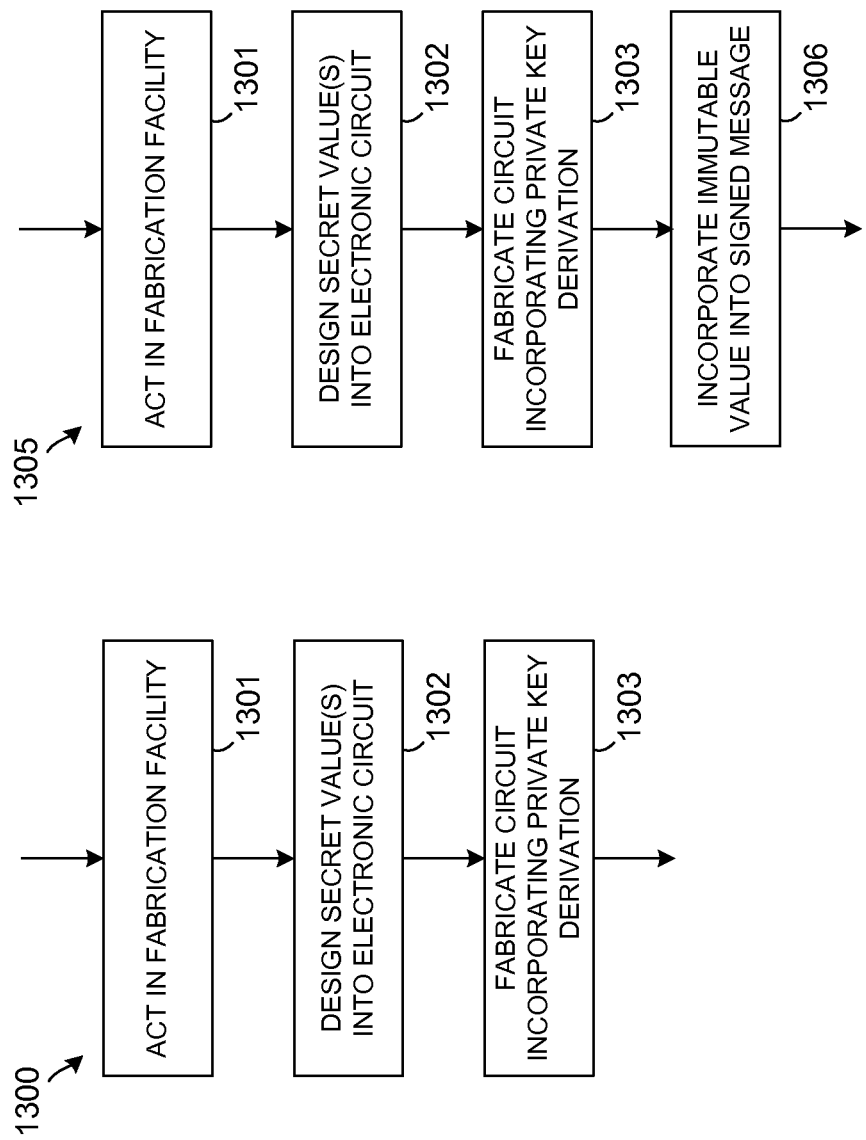
Referring to FIG. 13, including FIGS. 13.1, 13.2, and 13.3, are schematic flow charts showing an embodiment or embodiments of a method of provisioning an electronic circuit in a potentially untrusted environment.

Referring to FIG. 13, including FIGS. 13.1, 13.2, and 13.3, are schematic flow charts showing an embodiment or embodiments of a method of provisioning an electronic circuit in a potentially untrusted environment. An embodiment of the method 1300 of provisioning an electronic circuit can further include acting 1301 in a fabrication facility, designing 1302 at least one secret value into the electronic circuit such that instances of the electronic circuit hold an identical secret value, and fabricating 1303 the electronic circuit incorporating logic that derives a private key from the identical secret value, logic that generates a public key that matches the private key, logic that signs messages with the private key. In a further embodiment, the method 1305 of provisioning an electronic circuit can further include fabricating 1306 the electronic circuit further incorporating logic that incorporates an immutable value into the signed message such that the immutable value is selected from a group including a code-signing public key, a hash of the code-signing public key, and the like.

In some embodiments and/or applications, the method 1310 of provisioning an electronic circuit can further include acting 1311 in a trusted pre-production facility, generating 1312 a code-signing key pair, and signing 1313 code using the private key from the code-signing key pair. The method 1310 of provisioning the electronic circuit can further include using 1314 the electronic circuit to create a private key and a matching public key based on the at least one secret value, retaining 1315 the public key, and operating 1316 a server that holds OEM sensitive data, verifies a signature over messages using the public key, and sends OEM sensitive data to a production facility. In additional embodiments, the method 1320 of provisioning an electronic circuit can further include embedding 1321 an immutable value such as a code-signing public key acting as a trust anchor into at least one instance of the electronic circuit, causing 1322 the electronic circuit to generate a private key based on the immutable value and the at least one secret value, generating 1323 the message-signing public key, and retaining 1324 the message-signing public key. In still further embodiments, the method 1325 of provisioning an electronic circuit can further include maintaining 1326 an audit log that records messages, maintaining 1327 an audit log that records chip-unique identifiers from messages, and causing 1328 the electronic circuit to authenticate the pre-production facility.

In various embodiments and/or applications, the method 1330 of provisioning an electronic circuit can further include acting 1331 in an untrusted production facility, embedding 1332 a public key from a code-signing key pair into individual instances of a fabricated electronic circuit, loading 1333 code signed by a private key from the code-signing key pair into individual instances of a product incorporating the fabricated electronic circuit, and executing 1334 the signed code. Executing 1334 the signed code can include causing 1335 the electronic circuit to sign messages using the private key generated within the electronic circuit, and sending 1336 the signed message to a server 1316 operated by the pre-production facility. In an additional embodiment, the method 1340 of provisioning an electronic circuit can further include receiving 1341 OEM sensitive data from a pre-production facility, and causing 1342 instances of the fabricated electronic circuit to sign a message that includes a chip-unique identifier for the individual instances of the fabricated electronic circuit.

Figure 14:
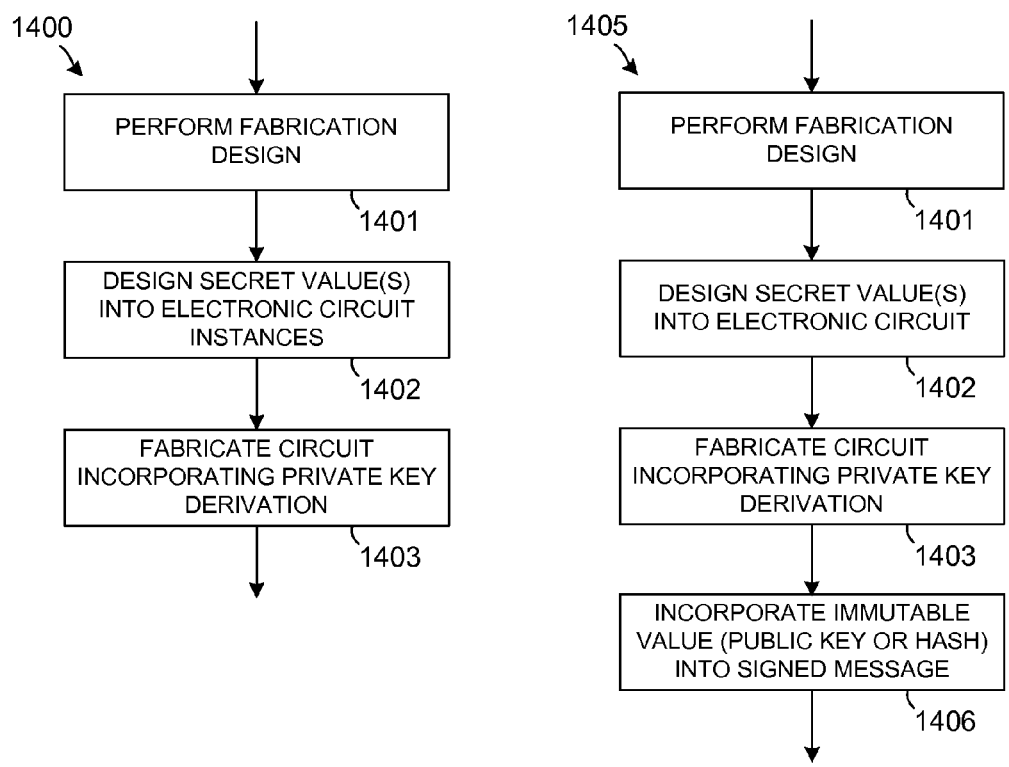
FIG. 14, including FIGS. 14.1 and 14.2, are schematic flow charts illustrating an embodiment or embodiments of a method of operating a production system in a potentially untrusted environment.

Referring to FIG. 14, including FIGS. 14.1 and 14.2, are schematic flow charts illustrating an embodiment or embodiments of a method of operating a production system in a potentially untrusted environment. An embodiment of a method 1400 of operating the production system can further include performing 1401 fabrication design, designing 1402 at least one secret value into the electronic circuit such that instances of the electronic circuit hold an identical secret value, and fabricating 1403 the electronic circuit incorporating logic that derives a message-signing private key from the identical secret value, logic that generates a public key that matches the private key, logic that signs messages with the private key. In a further embodiment, the method 1405 of operating the production system can further include fabricating 1406 the electronic circuit further incorporating logic that incorporates an immutable value into the signed message such that the immutable value can be selected from a code-signing public key, a hash of the code-signing public key, a chip-unique identifier, and the like.

In some embodiments and/or applications, the method 1410 of operating the production system can further include performing 1411 trusted pre-production, generating 1412 a code-signing key pair, signing 1413 code using a private key from the code-signing key pair, and using 1414 the electronic circuit to create a message-signing private key and a matching public key based on the at least one secret value. The method 1410 of operating the production system can further include retaining 1415 the message-signing public key, and operating 1416 a server that holds OEM sensitive data, verifies a signature over messages using the message-signing public key, and sends OEM sensitive data to a production facility. In additional embodiments, the method 1420 of operating the production system can further include embedding 1421 an immutable value into at least one instance of the electronic circuit, causing 1422 the electronic circuit to generate a message-signing private key based on the immutable value which can be a trust anchor and the at least one secret value, generating 1423 the public key, and retaining 1424 the public key. In further embodiments, the method 1425 of operating the production system can further include maintaining 1426 an audit log that records messages, maintaining 1427 an audit log that records chip-unique identifiers from messages, and causing 1428 the electronic circuit to authenticate the pre-production facility.

In some embodiments and/or applications, the method 1430 of operating the production system can further include performing 1431 untrusted production, embedding 1432 a public key from a code-signing key pair into individual instances of a fabricated electronic circuit as a trust anchor, embedding 1433 code signed by a private key from the code-signing key pair into individual instances of a product incorporating the fabricated electronic circuit, and executing 1434 the signed code. Executing 1434 the signed code can include causing 1435 the electronic circuit to sign messages using the message-signing private key generated within the electronic circuit, and sending 1436 the signed message to the server 1416 operated by the pre-production facility. In other embodiments, the method of operating the production system can further include receiving OEM sensitive data from a pre-production facility, and causing instances of the fabricated electronic circuit to sign a message that includes a chip-unique identifier for the individual instances of the fabricated electronic circuit.

The term "coupled", as may be used herein, includes direct coupling and indirect coupling via another component or element where, for indirect coupling, the intervening component or element does not modify the operation. Inferred coupling, for example where one element is coupled to another element by inference, includes direct and indirect coupling between two elements in the same manner as "coupled".

While the principles of the disclosed system are described above in connection with specific apparatus, it is to be clearly understood that this description is made only by way of example and not as a limitation on scope of the appended claims. The illustrative pictorial diagrams depict structures and process actions in a secure communication process. Although the particular examples illustrate specific structures and process acts, many alternative implementations are possible and commonly made by simple design choice. Actions may be executed in different order from the specific description herein, based on considerations of function, purpose, conformance to standard, legacy structure, and the like.

An embodiment of a method of provisioning an electronic circuit includes performing at least one provisioning action of a plurality of provisioning actions that are performed by a plurality of distinct actors. The plurality of provisioning actions include embedding at least one secret value into the electronic circuit, embedding a trust anchor into the electronic circuit, deriving a private key from the at least one secret value and the trust anchor, generating a public key that matches the private key, executing trust anchor-authenticated logic that contacts a predetermined actor of the plurality of distinct actors and communicates to the predetermined actor a message signed with the private key, and performing actions by the predetermined actor including authenticating the message and the trust anchor, and supplying sensitive data to the electronic circuit for storage. According to a further embodiment, the method of provisioning an electronic circuit further includes generating the at least one secret value for embedding into the electronic circuit. According to a further embodiment, the method of provisioning an electronic circuit further includes programming into the electronic circuit a private key derivation function that derives the private key from the at least one secret value and the trust anchor, and programming into the electronic circuit a public key generation function that generates a public key matching the private key. According to a further embodiment, the method of provisioning an electronic circuit further includes programming into the electronic circuit a private key signature generation function that generates a signature for signing a message with the private key. According to a further embodiment, the method of provisioning an electronic circuit further includes generating the trust anchor for embedding into the electronic circuit. According to a further embodiment, the method of provisioning an electronic circuit further includes invoking a private key derivation function that is programmed into the electronic circuit and derives a private key from the at least one secret value and the trust anchor and is known only to the electronic circuit, and invoking a public key generation function that is programmed into the electronic circuit and generates a public key matching the private key. According to a further embodiment, the method of provisioning an electronic circuit further includes receiving a message that is signed with the private key from the electronic circuit, authenticating the trust anchor-authenticated logic against the trust anchor, and transmitting sensitive data available in response to authentication of the signed message and the trust anchor to the electronic circuit for storage in nonvolatile memory. According to a further embodiment, the method of provisioning an electronic circuit further includes receiving at a server a message signed with the private key, authenticating the signed message and the trust anchor, and transmitting sensitive data in response to authentication of the signed message and the trust anchor. According to a further embodiment, the method of provisioning an electronic circuit further includes receiving the trust anchor, embedding the received trust anchor into the electronic circuit, invoking execution of the trust anchor-authenticated logic that contacts a server and communicates to the server a message signed with the private key that is known only to the electronic circuit and derived from the at least one secret value and the trust anchor, receiving sensitive data sent by the server in response to authentication by the server of the signed message and the trust anchor, and storing the sensitive data in nonvolatile memory. According to a further embodiment, the method of provisioning an electronic circuit further includes invoking the trust anchor-authenticated logic to contact a server, transmit to the server a message signed with the private key that is known only to the electronic circuit and derived from the at least one secret value and the trust anchor, and supply server-sensitive data to the electronic circuit. According to a further embodiment, the method of provisioning an electronic circuit further includes signing a message with the private key that is known only to the electronic circuit and derived from the at least one secret value and the trust anchor, sending the signed message to a server, invoking the server to authenticate the signed message and the trust anchor, and to send server-sensitive data to the electronic circuit, and invoking storage of the supplied server-sensitive data to nonvolatile memory.

An embodiment of a method of provisioning an electronic circuit includes generating at least one secret value, embedding the at least one secret value into the electronic circuit, programming into the electronic circuit a private key derivation function that derives the private key from the at least one secret value and a trust anchor, programming into the electronic circuit a public key generation function that generates a public key matching the private key, and receiving for execution trust anchor-authenticated logic that contacts a predetermined actor of the plurality of distinct actors and communicates to the predetermined actor a message signed with the private key. According to a further embodiment, the method of provisioning an electronic circuit further includes programming into the electronic circuit a private key signature generation function that generates a signature for signing a message with the private key.

An embodiment of a method of provisioning an electronic circuit includes generating a trust anchor, embedding the trust anchor into the electronic circuit, invoking derivation of a private key from at least one secret value embedded into the electronic circuit and the trust anchor, invoking generation of a public key that matches the private key, supplying to the electronic circuit trust anchor-authenticated logic that contacts a server and communicates to the server a message signed with the private key, authenticating the message and the trust anchor, and supplying sensitive data to the electronic circuit for storage. According to a further embodiment, the method of provisioning an electronic circuit further includes invoking a private key derivation function that is programmed into the electronic circuit and derives a private key from the at least one secret value and the trust anchor and is known only to the electronic circuit, and invoking a public key generation function that is programmed into the electronic circuit and generates a public key matching the private key. According to a further embodiment, the method of provisioning an electronic circuit further includes authenticating the trust anchor-authenticated logic against the trust anchor, signing a message with the private key, contacting the server, transmitting the signed message to the server for authenticating the signed message and the trust anchor, receiving sensitive data in response to authentication of the signed message and the trust anchor, and storing the sensitive data in nonvolatile memory. According to a further embodiment, the method of provisioning an electronic circuit further includes receiving at the server a message signed with the private key, authenticating the signed message and the trust anchor, and transmitting sensitive data in response to authentication of the signed message and the trust anchor.

An embodiment of a method of provisioning an electronic circuit includes providing the electronic circuit including at least one embedded secret value, a private key derived from the at least one secret value and a trust anchor, and a public key that matches the private key, receiving the trust anchor, embedding the received trust anchor into the electronic circuit, invoking execution of the trust anchor-authenticated logic that contacts a server and communicates to the server a message signed with the private key that is known only to the electronic circuit and derived from the at least one secret value and the trust anchor, receiving sensitive data sent by the server in response to authentication by the server of the signed message and the trust anchor, and storing the sensitive data in nonvolatile memory. According to a further embodiment, the method of provisioning an electronic circuit further includes invoking the trust anchor-authenticated logic to contact a server, transmit to the server a message signed with the private key that is known only to the electronic circuit and derived from the at least one secret value and the trust anchor, and supply server-sensitive data to the electronic circuit. According to a further embodiment, the method of provisioning an electronic circuit further includes signing a message with the private key that is known only to the electronic circuit and derived from the at least one secret value and the trust anchor, sending the signed message to a server, invoking the server to authenticate the signed message and the trust anchor, and to send server-sensitive data to the electronic circuit, and invoking storage of the supplied server-sensitive data to nonvolatile memory.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, components, configurations, and topologies are given by way of example only. The parameters, components, configurations, and topologies can be varied to achieve the desired structure as well as modifications, which are within the scope of the claims. Variations and modifications of the embodiments disclosed herein may also be made while remaining within the scope of the following claims.

What is claimed is:

1. A method of provisioning a first electronic circuit comprising:
storing, within the electronic circuit, a message signing private key that is inaccessible external to the first electronic circuit; storing, within the electronic circuit one or more immutable domain parameters;
storing, within the electronic circuit, an immutable trust anchor that is derived from a code signing public key;
generating, by private key derivation logic of the first electronic circuit, the message signing private key using a combination of the trust anchor and the one or more immutable domain parameters;
storing the message signing private key in a first circuitry;
generating, by public key generation logic of the first electronic circuit, a message signing public key to match the message signing private key;
deriving a value from the code signing public key;
comparing the value derived from the code signing public key with the trust anchor stored in the first circuitry;
verifying a signature of signed provisioning code using the code signing public key, wherein the signed provisioning code includes provisioning code and the signature;
receiving a challenge message from a remote computer system, wherein the remote computer system has a message signing public key that was generated by a second electronic circuit, wherein the message signing public key was generated by the second electronic circuit using a message signing private key that was generated using the trust anchor and the one or more immutable domain parameters, which also are stored in the second electronic circuit, and wherein the message signing private key used by the second electronic circuit is the same as the message signing private key generated by the first electronic circuit;
preparing, by message signing logic of the first electronic circuit, a signed response message using the message signing private key;
sending the signed response message to the remote computer system; and receiving sensitive provisioning information from the remote computer system when the remote computer system is able to verify the signed response message using the message signing public key.

2. The method according to claim 1, further comprising:
preventing use, by a secure boot logic, of the message signing logic unless software authentication is successful and the authenticated software contains a correct capability token.

3. The method according to claim 1, further comprising:
storing, within the electronic circuit, an immutable message tag concatenated with all messages prior to signing by the message signing logic.

4. The method according to claim 3, further comprising:
storing, within the electronic circuit, one or more immutable message tag components;

deriving, by message tag derivation logic of the electronic circuit, a message tag from the message tag components;
storing the message tag in a message tag register of the first electronic circuit; and
locking the message tag register against modification after storing the message tag.

5. The method according to claim 4, further comprising:
cryptographically binding, by the message signing logic, messages to the trust anchor by including the trust anchor as one of the message tag components.

6. The method according to claim 4, further comprising:
provisioning message tag component storage of the first electronic circuit with message tag components; and
protecting the message tag component storage against further modification using one-time programmable fuses for a unique identifier or serial number, or the trust anchor, where the message tag components can be either common or specific to copies of the electronic circuit.

7. The method according to claim 4, further comprising:
accessing, by the message derivation logic, the message tag components directly.

8. The method according to claim 4, further comprising:
copying the message tag components to the message tag derivation logic.

9. The method according to claim 1, further comprising:
storing the message signing private key in a private key register of the first electronic circuit; and
locking the private key register against modification after storing the message signing private key, wherein the private key register is readable only by the public key generation logic and the message signing logic.

10. The method according to claim 9, further comprising:
cryptographically binding messages to the trust anchor, by the message signing logic, using the trust anchor.

11. The method according to claim 9, further comprising:
permanently storing, within the electronic circuit, independent private key components, wherein the independent private key components are selected from a logic secret value embedded within the private key derivation logic or other electronic circuit logic, a read-only memory (ROM) secret value masked in ROM.

12. The method according to claim 9, further comprising:
provisioning private key component storage of the first electronic circuit with independent private key components and protected against further modification, wherein the private key component storage includes one-time programmable fuses for a secret value or the trust anchor, and wherein the first electronic circuit, once provisioned with the private key components are either common to or specific to copies of the first electronic circuit.

13. The method according to claim 9, further comprising:
accessing, by the private key derivation logic, the private key components directly.

14. The method according to claim 9, further comprising:
copying the private key components to the private key derivation logic; and
preventing, by the private key derivation logic, further access to the private key components.

* * * * *